United States Patent
Yeo et al.

(10) Patent No.: US 12,471,133 B2
(45) Date of Patent: Nov. 11, 2025

(54) SIDELINK RESOURCE DETERMINATION AND SIDELINK SIGNAL TRANSMISSION AND RECEPTION METHOD AND DEVICE IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Hyunseok Ryu, Gyeonggi-do (KR); Cheolkyu Shin, Gyeonggi-do (KR); Jinyoung Oh, Gyeonggi-do (KR); Jonghyun Bang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 453 days.

(21) Appl. No.: 17/630,690

(22) PCT Filed: Aug. 3, 2020

(86) PCT No.: PCT/KR2020/010231
§ 371 (c)(1),
(2) Date: Jan. 27, 2022

(87) PCT Pub. No.: WO2021/020954
PCT Pub. Date: Feb. 4, 2021

(65) Prior Publication Data
US 2022/0330261 A1   Oct. 13, 2022

(30) Foreign Application Priority Data
Aug. 1, 2019  (KR) .................. 10-2019-0094024

(51) Int. Cl.
*H04W 72/543*  (2023.01)
*H04L 5/00*  (2006.01)
(Continued)

(52) U.S. Cl.
CPC ......... *H04W 72/543* (2023.01); *H04L 5/0064* (2013.01); *H04W 72/0473* (2013.01); *H04W 72/56* (2023.01)

(58) Field of Classification Search
CPC ............... H04W 72/543; H04W 72/56; H04W 72/0473; H04L 5/0064
See application file for complete search history.

(56) References Cited

U.S. PATENT DOCUMENTS

| 8,437,269 B2 | 5/2013 | Wang et al. |
| 9,225,503 B2 | 12/2015 | Kim et al. |

(Continued)

FOREIGN PATENT DOCUMENTS

| CN | 101946463 | 1/2011 |
| CN | 103548409 | 1/2014 |

(Continued)

OTHER PUBLICATIONS

Huawei, HiSilicon, "Relative QoS Handling Between NR SL and NR Uu", R2-1907456, 3GPP TSG-RAN WG2 Meeting #106, May 13-17, 2019, 2 pages.

(Continued)

*Primary Examiner* — Ajay Cattungal
(74) *Attorney, Agent, or Firm* — The Farrell Law Firm, P.C.

(57) ABSTRACT

In an embodiment of the disclosure, an operating method performed by a user equipment (UE) in a wireless communication system includes: receiving, from a base station (BS), an uplink resource configuration (configured grant) including a first quality of service (QOS) threshold and a sidelink resource configuration including a second QoS threshold; determining priority between uplink transmission and sidelink transmission, based on the first QoS threshold and the second QoS threshold; and transmitting at least one (Continued)

of uplink data or sidelink data, based on a result of the determining.

13 Claims, 31 Drawing Sheets

(51) Int. Cl.
*H04W 72/044* (2023.01)
*H04W 72/56* (2023.01)

(56) References Cited

U.S. PATENT DOCUMENTS

| | | | |
|---|---|---|---|
| 11,057,176 | B2 | 7/2021 | Yeo et al. |
| 2017/0013640 | A1 | 1/2017 | Loehr et al. |
| 2017/0353819 | A1 | 12/2017 | Yin et al. |
| 2018/0212800 | A1 | 7/2018 | Park et al. |
| 2019/0053253 | A1* | 2/2019 | Jung .................. H04W 76/23 |
| 2019/0182639 | A1 | 6/2019 | Basu Mallick et al. |
| 2020/0287665 | A1 | 9/2020 | Lee et al. |
| 2020/0396701 | A1* | 12/2020 | Yi ..................... H04W 72/569 |
| 2021/0007002 | A1* | 1/2021 | Kang .................... H04W 4/70 |
| 2021/0029723 | A1* | 1/2021 | Wu ..................... H04W 72/569 |
| 2021/0168832 | A1* | 6/2021 | Zhuo ................. H04W 28/0278 |
| 2021/0329568 | A1* | 10/2021 | Zhang .................... H04W 4/70 |

FOREIGN PATENT DOCUMENTS

| | | |
|---|---|---|
| KR | 1020190058579 | 5/2019 |
| WO | WO 2018/074876 | 4/2018 |
| WO | WO 2018/160015 | 9/2018 |
| WO | WO 2019/066558 | 4/2019 |
| WO | WO 2020/006366 | 1/2020 |

OTHER PUBLICATIONS

Huawei, HiSilicon, "Discussion on UE Tx Timing Requirement in V2X", R4-1610096, 3GPP TSG-RAN WG4 Meeting #81, Nov. 14-18, 2016, 3 pages.
European Search Report dated Jul. 4, 2022 issued in counterpart application No. 20845945.3-1215, 10 pages.
Huawei, HiSilicon, "QoS Management for NR Sidelink", R1-1903952, 3GPP TSG RAN WG1 Meeting #96bis, Apr. 8-12, 2019, 4 pages.
Vivo, "Remaining Issues on Sidelink Configured Grant", R2-1905838, 3GPP TSG-RAN WG2 Meeting #106, May 13-17, 2019, 7 pages.
Vivo, "Uplink and Sidelink Transmission Prioritization in NR V2X", R2-1905847, 3GPP TSG-RAN WG2 Meeting #106, May 13-17, 2019, 8 pages.
AT&T, "Resource Allocation Mechanism", R1-1810700, 3GPP TSG RAN WG1 Meeting #94bis, Oct. 8-12, 2018, 4 pages.
Lenovo, "SA Content for V2V", R1-164636, 3GPP TSG RAN WG1 Meeting #85, May 23-27, 2016, 6 pages.
International Search Report dated Oct. 21, 2020 issued in counterpart application No. PCT/KR2020/010231, 14 pages.
Indian Examination Report dated Jan. 10, 2024 issued in counterpart application No. 202237007318, 6 pages.
Chinese Office Action dated Jun. 29, 2024 issued in counterpart application No. 202080068108.8, 20 pages.
European Search Report dated Jul. 17, 2024 issued in counterpart application No. 20845945.3-1215, 7 pages.
Huawei et al., "Support of Simultaneous Transmission of UL and SL", R2-167927, 3GPP TSG RAN WG2 Meeting #96, Nov. 14-18, 2016, 3 pages.
Korean Office Action dated Nov. 22, 2024 issued in counterpart application No. 10-2019-0094024, 12 pages.
Ericsson, "On Configuration Aspects for Multiple SPS and CG", R2-1906838, 3GPP TSG-RAN WG2 #106, May 13-17, 2019, 4 pages.
Samsung, "On Resource Allocation for NR V2X Mode 1", R1-1906935, 3GPP TSG RAN WG1 #97, May 13-17, 2019, 8 pages.
Chinese Office Action dated Dec. 30, 2024 issued in counterpart application No. 202080068108.8, 23 pages.
Ericsson, "Corrections to UL/SL Prioritization", R2-1703541, 3GPP TSG-RAN WG2 Meeting #97bis, Apr. 3-7, 2017, 11 pages.
Korean Office Action dated Jul. 29, 2025 issued in counterpart application No. 10-2019-0094024, 12 pages.

\* cited by examiner

SIDELINK RESOURCE DETERMINATION AND SIDELINK SIGNAL TRANSMISSION AND RECEPTION METHOD AND DEVICE IN WIRELESS COMMUNICATION SYSTEM

PRIORITY

This application is a National Phase Entry of PCT International Application No. PCT/KR2020/010231, which was filed on Aug. 3, 2020, and claims priority to Korean Patent Application No. 10-2019-0094024, which was filed on Aug. 1, 2019, the entire content of each of which is incorporated herein by reference.

TECHNICAL FIELD

The disclosure relates to a method and apparatus for determining a sidelink resource and transmitting or receiving sidelink signals in a wireless communication system. More particularly, the disclosure relates to a method and apparatus, by which a user equipment determines timing and resources for performing sidelink data transmission after receiving scheduling information from a base station, and performs slot mapping in the sidelink data transmission.

BACKGROUND ART

To meet the demand with respect to ever-increasing wireless data traffic since the commercialization of the 4th generation (4G) communication system, there have been efforts to develop an advanced 5th generation (5G) or pre-5G communication system. For this reason, the 5G or pre-5G communication system is also called a beyond 4th-generation (4G) network communication system or post long term evolution (LTE) system. Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet technology (IT) services that create new value to human life by collecting and analyzing data generated among connected things. IoT may be applied to a variety of areas, such as smart home, smart buildings, smart cities, smart cars or connected cars, smart grid, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be viewed as an example of convergence of 5G and IoT technologies.

With the development of the aforementioned technologies and mobile communication systems, it is possible to provide various services, and there is a need for a method to provide the services effectively. For example, a scheme for resource allocation in a wireless communication system is required.

DESCRIPTION OF EMBODIMENTS

Technical Problem

Embodiments of the disclosure provide a method and apparatus for determining a sidelink resource and transmitting or receiving sidelink signals in a wireless communication system.

Solution to Problem

According to an embodiment of the disclosure, a sidelink communication method of a user equipment (UE) in a wireless communication system includes: receiving system information including a resource pool from a base station; selecting a resource for sidelink communication from among the resource pool based on the received system information; transmitting sidelink control information (SCI) in a physical sidelink control channel (PSCCH) based on the selected resource; and transmitting data in a physical sidelink shared channel (PSSCH) based on the SCI.

Advantageous Effects of Disclosure

Embodiments of the disclosure provide an apparatus and method of effectively providing a service in a mobile communication system.

MODE OF DISCLOSURE

Figure 1:
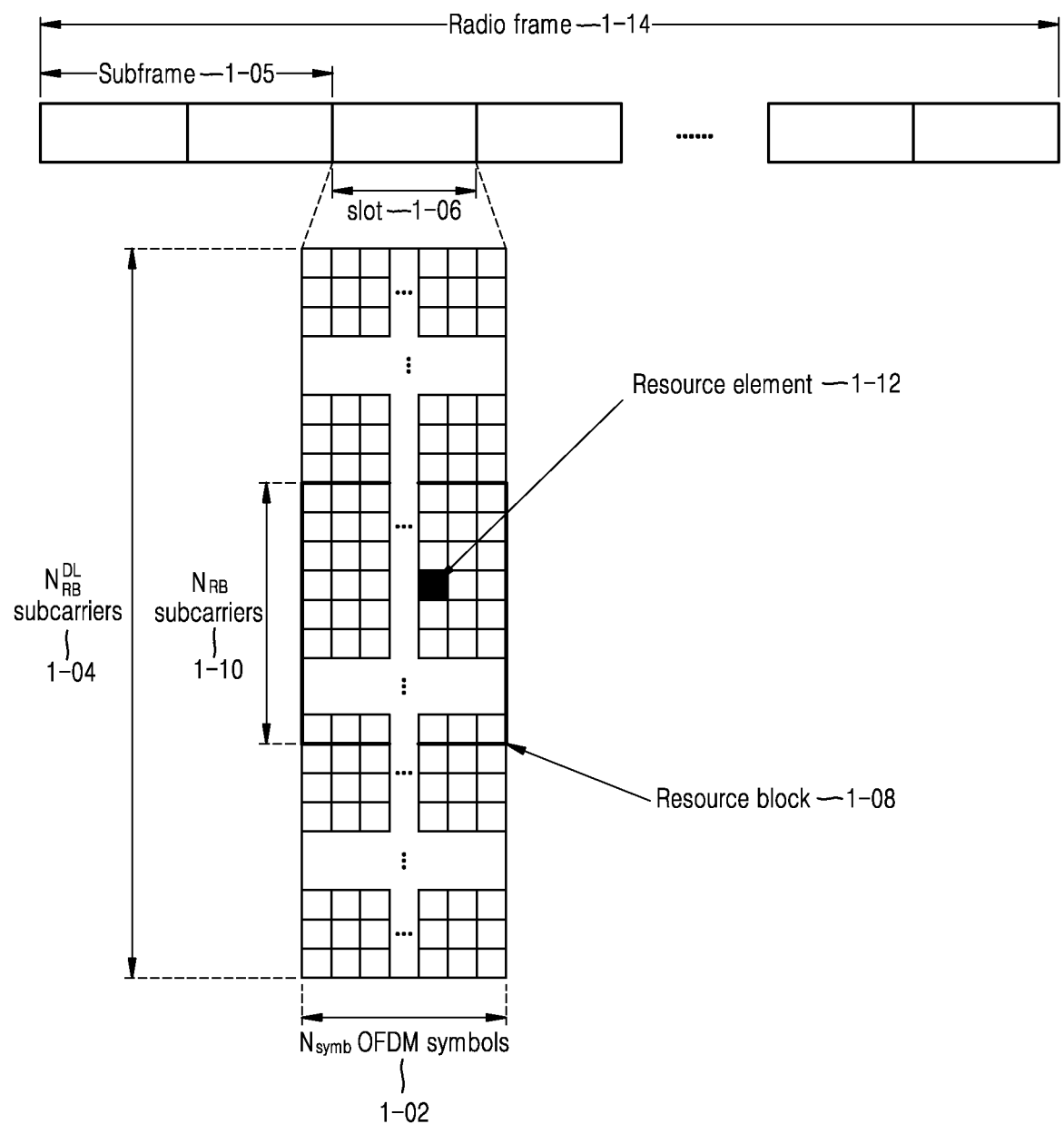
FIG. 1 illustrates a basic structure of time-frequency domain, which is a radio resource domain where data or control channels are transmitted in a new radio (NR) system, according to an embodiment of the disclosure.

To meet the ever-increasing demand with respect to wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long-term evolution (LTE) system. The 5G communication system defined by the 3rd Generation Partnership Project (3GPP) is called a new radio (NR) system. Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultra-frequency bands, beamforming, massive multiple-input multiple-output (MIMO), full dimensional MIMO (FD-MIMO), array antennas, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multipoints (COMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet technology (IT) services that create new value to human life by collecting and analyzing data generated among connected things. IoT may be applied to a variety of areas, such as smart home, smart buildings, smart cities, smart cars or connected cars, smart grid, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies.

In the meantime, a new radio access technology (NR) system for new 5G communication is designed to freely multiplex various services in time and frequency resources, so that a waveform/numerology or the like, and a reference signal or the like, may be dynamically or freely allocated as required for the corresponding service. For wireless communication to provide a best service to a terminal, it is important to optimize data transmission through measurement of quality and interference of a channel, and accordingly, channel state measurement is essential. However, unlike the fourth generation (4G) communication where channel and interference properties are not significantly changed depending on frequency resources, a 5G or NR channel has channel and interference properties that significantly change depending on services and is thus required to support a frequency resource group (FRG)-wise subset, which enables division of the measurement. In the meantime, service types supported in the NR system may be divided into categories, such as enhanced mobile broadband (eMBB), massive machine type communications (mMTC), ultra-reliable and low-latency communications (URLLC), etc. The eMBB is a service for high rate transmission of high volume data, the mMTC is a service for least power consumption at the terminal and accesses of multiple terminals, and the URLLC is a service for high reliability and low latency. Depending on the type of service applied to the terminal, different requirements may be applied.

In the communication system, a plurality of services may be provided for a user, and to provide such a plurality of services for the user, a method of providing the respective services to fit their characteristics in a same time interval and a corresponding apparatus are required.

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order.

Furthermore, the term 'unit' or 'module' as herein used refers to a software or hardware component, such as field programmable gate array (FPGA) or application specific integrated circuit (ASIC) which plays some role. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e communication standards. Furthermore, for the fifth generation (5G) wireless communication system, communication standards for 5G or new radio (NR) are being made.

As a representative example of a wide band wireless communication system, the NR system employs orthogonal frequency division multiplexing schemes for downlink (DL) and uplink (UL). Specifically, a cyclic prefix OFDM (CP-OFDM) scheme is employed for DL, and together with the CP-OFDM, discrete Fourier transform spreading OFDM (DFT-S-OFDM) scheme is employed for UL. The UL refers to a radio link for a terminal (or user equipment (UE) or mobile station (MS)) to transmit data or a control signal to a base station (BS, or gNode B), and the DL refers to a radio link for a BS to transmit data or a control signal to a terminal. Such a multiple access scheme allocates and operates time-frequency resources carrying data or control information for each user not to overlap, i.e., to maintain orthogonality, thereby differentiating each user's data or control information.

The NR system adopts a hybrid automatic repeat request (HARQ) scheme that retransmits corresponding data at the physical layer in case decoding fails at an early stage of transmission. By the HARQ scheme, when a receiver fails to correctly decode data, the receiver transmits information indicating the decoding failure (NACK; negative acknowledgment) to a transmitter so that the transmitter may retransmit the corresponding data at the physical layer. The receiver may increase data reception capability by combining the data retransmitted by the transmitter with the data for which decoding has failed. Further, in a case that the receiver correctly decodes data, the receiver may transmit information indicating decoding success (ACK; acknowledgment) to the transmitter so that the transmitter may transmit new data.

The disclosure relates to a method and apparatus for determining a sidelink resource and transmitting or receiving sidelink signals in a wireless communication system. More particularly, the disclosure relates to a method and apparatus, by which a user equipment determines timing and resources when performing sidelink data transmission after receiving scheduling information from a base station, and performs slot mapping in the sidelink data transmission.

In an embodiment of the disclosure, for sidelink transmission, a method of determining a minimum processing time based on a time at which BS scheduling information is transmitted, and a method of determining a time to transmit actual sidelink control signals and data are provided. Furthermore, for the sidelink data transmission, a rate matching method is provided when a method of mapping data to one or more slots is performed.

In a wireless communication system, an NR system in particular, when a transmitting end transmits data to a receiving end, the receiving end may receive the data and transmit HARQ-ACK feedback information for the data to the transmitting end. For example, for DL data transmission, the UE may transmit, to the BS, HARQ-ACK feedback information for the data transmitted from the BS based on a configured resource.

For sidelink data transmission, a receiving UE may transmit HARQ-ACK feedback to a transmitting UE. Such HARQ-ACK feedback may also be used as information for the transmitting UE to determine retransmission. For a physical channel on which the receiving UE transmits the HARQ-ACK feedback, a physical sidelink feedback channel (PSFCH) may be used. Not all the slots for sidelink may have a resource in which to transmit the PSFCH, so the receiving UE may need to transmit pieces of HARQ-ACK feedback information for multiple data (physical sidelink shared channels (PSSCHs)) on one PSFCH. The disclosure provides a method and apparatus for transmitting HARQ-ACK feedback in UE-to-UE communication, i.e., sidelink communication. In the disclosure, the receiving UE may transmit HARQ-ACK feedback to the transmitting UE in a sidelink.

FIG. 1 illustrates a basic structure of time-frequency domain, which is a radio resource domain where data or control channels are transmitted in a new radio (NR) system, according to an embodiment of the disclosure.

Specifically, FIG. 1 illustrates a basic structure of time-frequency domain, which is a radio resource domain where data or control channel is transmitted in a DL or a UL in an NR system.

Referring to FIG. 1, the horizontal axis represents the time domain, and the vertical axis represents the frequency domain. A minimum transmission unit in the time domain is an OFDM symbol, and $N_{symb}$ OFDM symbols 1-02 together define a slot 1-06. A subframe is defined to be 1.0 ms long, and a radio frame 1-14 is defined to be 10 ms long. A minimum transmission unit in the frequency domain is a subcarrier, and bandwidth of a whole system transmission band may be comprised of a total of New subcarriers 1-04.

The basic resource unit in the time-frequency domain is a resource element 1-12 (RE), which may be represented by an OFDM symbol index and a subcarrier index. A resource block (RB) 1-08 or a physical resource block (PRB) may be defined with $N_{symb}$ successive OFDM symbols 1-02 in the time domain and $N_{RB}$ successive subcarriers 1-10 in the frequency domain. Accordingly, the one RB 1-08 may be comprised of $N_{symb} \times N_{RB}$ REs 1-12. Generally, a minimum data transmission unit is an RB. In the NR system, it is common that $N_{symb}=14$ and $N_{RB}=12$, and New and $N_{RB}$ may be proportional to the bandwidth of a system transmission band. A data rate may increase in proportion to the number of RBs scheduled for the UE.

In the NR system, for an FDD system that operates DL and UL distinguished by frequency, a downlink transmission bandwidth may differ from an uplink transmission bandwidth. A channel bandwidth may refer to an RF bandwidth corresponding to the system transmission bandwidth. Table 1 and table 2 represent some of corresponding relationships between a system transmission bandwidth, subcarrier spacing, and a channel bandwidth defined in an NR system in frequency bands lower than 6 GHz and higher than 6 GHz, respectively. For example, the NR system having a 100 MHz channel bandwidth with 30 kHz subcarrier spacing has a transmission bandwidth consisting of 273 RBs. In the following description, N/A may be a bandwidth-subcarrier combination not supported by the NR system.

TABLE 1 configuration of frequency range 1 (FR1)

| Channel bandwidth $BW_{Channel}$ [MHz] | Subcarrier spacing | 5 MHz | 10 MHz | 20 MHz | 50 MHz | 80 MHz | 100 MHz |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2 configuration of frequency range 2 (FR2)

| Channel bandwidth $BW_{Channel}$ [MHz] | Subcarrier spacing | 50 MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

A frequency range in the NR system may be defined by being divided into FR1 and FR2 as follows.

| Frequency range designation | Corresponding frequency range |
|---|---|
| FR1 | 450 MHz-7125 MHz |
| FR2 | 24250 MHz-52600 MHz |

Ranges of FR1 and FR2 may be changed differently and used. For example, a frequency range of FR1 may be changed and used from 450 MHz to 6000 MHz.

In the NR system, scheduling information on downlink data or uplink data is transferred through downlink control information (DCI) from the BS to the UE. The DCI may be defined in various formats, and depending on each format, the DCI may indicate whether it is scheduling information (UL grant) for UL data or scheduling information (DL grant) for DL data, whether it is compact DCI with a certain size or less of control information, whether spatial multiplexing is applied using multiple antennas, whether it is DCI for power control, etc. For example, DCI format 1-1 that is scheduling control information for DL data (DL grant) may include at least one piece of the following control information:

carrier indicator: indicates which frequency carrier is used for transmission.
DCI format indicator: an indicator for distinguishing whether the DCI is for DL or UL.
bandwidth part (BWP) indicator: indicates which BWP is used for transmission.
frequency domain resource allocation: indicates an RB in the frequency domain allocated for data transmission. A resource represented by a system bandwidth and a resource allocation scheme is determined.
time domain resource allocation: indicates which slot and which OFDM symbol in the slot are used to transmit a data-related channel.
VRB-to-PRB mapping: indicates which scheme is used to map a virtual RB (VRB) index and a physical RB (PRB) index.
modulation and coding scheme (MCS): indicates the size of a transport block that is data to be transmitted and a modulation scheme used for data transmission.
HARQ process number: indicates a process number of an HARQ.
new data indicator: indicates whether it is HARQ initial transmission or retransmission.
redundancy version: indicates a redundancy version of an HARQ.
transmit power control (TPC) command for physical uplink control channel (PUCCH): indicates a transmit power control command for UL control channel PUCCH.

For physical downlink shared channel (PDSCH) or physical uplink shared channel (PUSCH) data transmission, time domain resource allocation may be determined by information about a slot in which the PDSCH/PUSCH is transmitted, a start symbol position S in the slot, and the number L of symbols to which the PDSCH/PUSCH is mapped. S may be a relative position from the start of the slot, L may be the number of successive symbols, and the S and L may be determined from a start and length indicator value (SLIV) defined as follows:

```
if (L − 1) ≤ 7 then
    SLIV = 14·(L − 1) + S
else
    SLIV = 14·(14 − L + 1) + (14 − 1 − S)
where 0 < L ≤ 14 − S
```

In the NR system, a UE may be configured with information about an SLIV value, a PDSCH/PUSCH mapping type, and a slot in which the PDSCH/PUSCH is transmitted in a row (e.g., the information may be configured in the form of a table) through RRC configuration. Subsequently, time domain resource allocation in DCI indicates an index value in the configured table, so that the BS may deliver, to the UE, information about an SLIV value, a PDSCH/PUSCH mapping type, and a slot in which the PDSCH/PUSCH is transmitted.

In the NR system, type A and type B may be defined for the PDSCH mapping type. For the PDSCH mapping type A, the first of DMRS symbols may be located in the second or third OFDM symbol of a slot. For the PDSCH mapping type B, the first of DMRS symbols may be located in the first OFDM symbol in a time domain resource allocated in PUSCH transmission.

DCI may be transmitted in a physical downlink control channel (PDCCH) after going through channel coding and modulation processes. In the disclosure, control information being transmitted on a PDCCH or PUCCH may be expressed as the PDCCH or PUCCH being transmitted. Likewise, in the disclosure, data being transmitted on a PUSCH or PDSCH may be expressed as the PUSCH or PDSCH being transmitted.

In general, DCI may be scrambled by a specific radio network temporary identifier (RNTI) (or a UE identifier) separately for each UE, having cyclic redundancy check (CRC) added thereto, channel-coded, and then configured and transmitted in a separate PDCCH. The PDCCH may be mapped and transmitted in a control resource set (CORE-SET) configured for the UE.

DL data may be transmitted on a physical downlink shared channel (PDSCH), which is a physical channel for DL data transmission. The PDSCH may be transmitted after a control channel transmission interval, and scheduling information such as a specific mapping position in the frequency domain, modulation scheme, etc., may be determined based on the DCI transmitted through the PDCCH.

Through a modulation coding scheme (MCS) of the control information that makes up the DCI, the BS may notify the UE of a modulation scheme applied to the PDSCH for transmission and the size of data to be transmitted (transport block size; TBS). In an embodiment of the disclosure, an MCS may be comprised of 5 bits or more than or less than 5 bits. The transport block size (TBS) may correspond to the size before channel coding for error correction is applied to the data (transport block; TB) to be transmitted by the BS.

In the disclosure, the transport block (TB) may include a medium access control (MAC) header, a MAC control element (CE), one or more MAC service data units (MAC SDUs), and padding bits. Alternatively, the TB may represent a data unit or a MAC protocol data unit (MAC PDU) delivered to the physical layer from the MAC layer.

The NR system supports the following modulation schemes: QPSK (quadrature phase shift keying), 16QAM (quadrature amplitude modulation), 64QAM, and 256QAM, and their respective modulation orders Qm are 2, 4, 6, and 8. For example, two bits per symbol for QPSK modulation, 4 bits per symbol for 16QAM modulation, 6 bits per symbol for 64QAM modulation, and 8 bits per symbol for 256QAM modulation may be transmitted.

Figure 2:
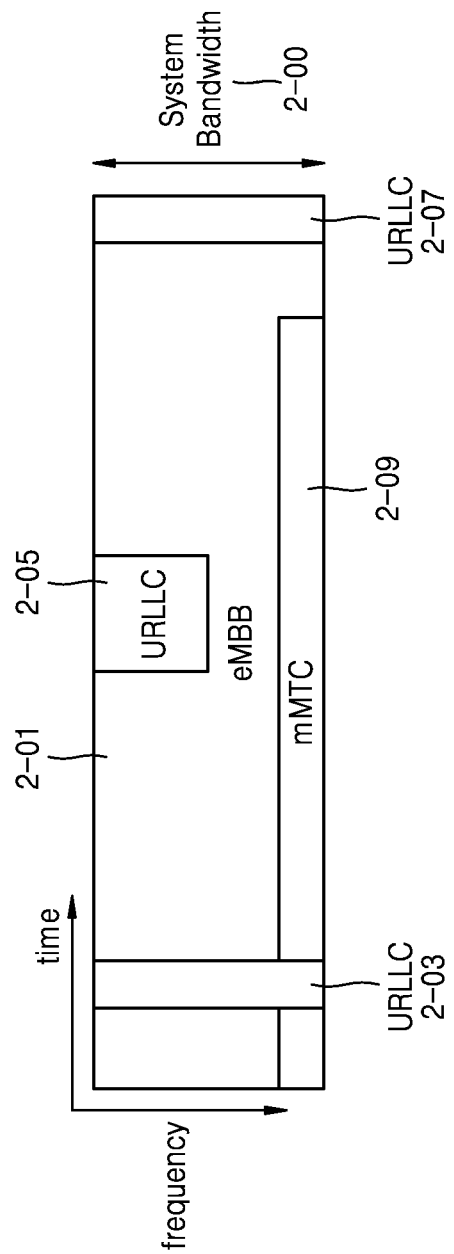
FIG. 2 is a diagram for describing frequency and time resource allocation for transmission of information in an NR system, according to an embodiment of the disclosure.
Figure 3:
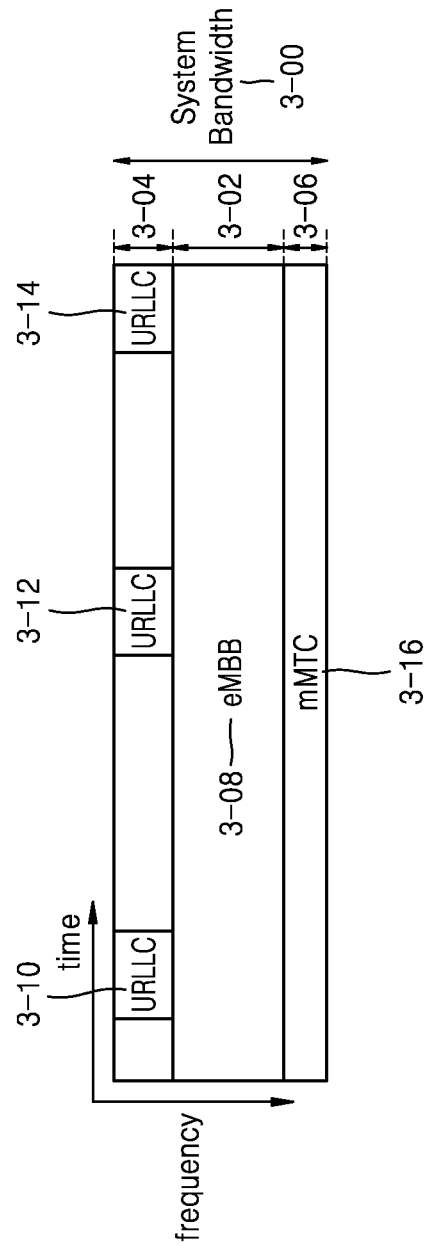
FIG. 3 is another diagram for describing frequency and time resource allocation for transmission of information in an NR system, according to an embodiment of the disclosure.

FIGS. 2 and 3 are diagrams for describing allocation of data for eMBB, URLLC, and mMTC services considered in a 5G or NR system in frequency-time resources. Referring to FIGS. 2 and 3, a method of allocating frequency and time resources for information transmission in each system will be described.

FIG. 2 is a diagram for describing frequency and time resource allocation for transmission of information in an NR system, according to an embodiment of the disclosure.

Referring to FIG. 2, data for eMBB, URLLC, and mMTC may be allocated in a whole system frequency band 2-00. When URLLC data 2-03, 2-05, and 2-07 needs to be transmitted while eMBB 2-01 and mMTC 2-09 are allocated and being transmitted in a particular frequency band, the URLLC data 2-03, 2-05, and 2-07 may be transmitted without emptying or transmitting a portion already allocated the eMBB 2-01 and the mMTC 2-09. Of the services, URLLC requires reduction in latency, so that the URLLC data 2-03, 2-05, and 2-07 may be allocated and transmitted in a portion of the resource allocated the eMBB data 2-01. When URLLC is further allocated and transmitted in a resource allocated eMBB, the eMBB data may not be transmitted in the overlapping frequency-time resource, and accordingly, transmission performance for the eMBB data may be reduced. In other words, eMBB data transmission failure may occur due to the URLLC allocation.

FIG. 3 is another diagram for describing frequency and time resource allocation for transmission of information in an NR system, according to an embodiment of the disclosure.

Referring to FIG. 3, a whole system frequency band 3-00 may be divided into respective sub-bands 3-02, 3-04, and 3-06 to be used for transmitting services and data. Information regarding sub-band configuration may be pre-determined, and the information may be transmitted by higher layer signaling of a BS. Furthermore, the sub-band may be arbitrarily divided by the BS or a network node, and accordingly, services may be provided without extra transmission of sub-band configuration information to the UE. Referring to FIG. 3, the sub-band 3-02 may be used for data transmission of eMBB 3-08, the sub-bad 3-04 may be used to transmit for data transmission of URLLC 3-10, 3-12, and 3-14, and the sub-band 3-06 may be used for data transmission of mMTC 3-16.

A length of transmission time interval (TTI) used for URLLC transmission may be shorter than a TTI length used for the eMBB or mMTC transmission. Furthermore, a response to information regarding the URLLC may be transmitted faster than the eMBB or the mMTC, and accordingly, the information may be transmitted or received with low latency. To transmit the aforementioned three services or data, physical layer channels used for the respective types may have different structures. For example, at least one of a length of transmission time interval (TTI), a frequency resource allocation unit, a control channel structure, and a data mapping method may be different.

Although three types of service and three types of data are described in FIGS. 2 and 3, there may be more types of services and corresponding data, and even in this case, the disclosure may be applied.

In the disclosure, the terms physical channel and signal in the NR system may be used. However, the disclosure may be applied to other wireless communication systems than the NR system.

Hereinafter, sidelink (SL) refers to a signal transmission or reception path between UEs, and may be interchangeably used with a PC5 interface. A base station (BS) is an entity that performs resource allocation for a UE, and may be a BS that supports both vehicle to everything (V2X) communication and common cellular communication, or a BS that supports only V2X communication. That is, the BS may refer to an NR BS (gNB), an LTE BS (eNB), or a road site unit (RSU) (or a stationary station). A UE or terminal may include not only a general user equipment or a mobile station, but also a vehicle that supports vehicle-to-vehicle (V2V) communication, a vehicle or a pedestrian's headset (e.g., a smartphone) that supports vehicle-to-pedestrian (V2P) communication, a vehicle that supports vehicle-to-network (V2N) communication, a vehicle that supports vehicle-to-infrastructure (V2I) communication, an RSU equipped with a UE function, an RSU equipped with a BS function, an RSU equipped with part of the BS function and a part of the UE function, or the like. In the disclosure, downlink (DL) refers to a radio transmission path for a signal transmitted from a BS to a UE, and uplink (UL) refers to a radio transmission path for a signal transmitted from a UE to a BS. An embodiment of the disclosure will now be described based on the NR system, but the embodiment of the disclosure may be equally applied to any wireless communication system with similar technical backgrounds or channel types. Furthermore, embodiments of the disclosure will also be applied to other communication systems through some modifications to an extent that does not significantly deviate from the scope of the disclosure when judged by those skilled in the art.

In the disclosure, the existing terms 'physical channel' and 'signal' may be interchangeably used with data or a control signal. For example, a PDSCH is a physical channel in which to transmit data, but the PDSCH may refer to data.

Hereinafter, in the disclosure, higher layer signaling may refer to a method of transferring a signal to the UE from the BS in a DL data channel of the physical layer or to the BS from the UE in a UL data channel of the physical layer, and may also be referred to as RRC signaling or an MAC control element (CE).

In the following embodiment, provided is a method and apparatus for performing transmission or reception of HARQ-ACK feedback for data transmission between the BS and the UE or between UEs. In this case, the feedback may be transmitted from a single UE to a plurality of UEs, or the feedback may be transmitted from a UE to another UE. Furthermore, the feedback may be transmitted from a BS to a plurality of UEs. It is not, however, limited thereto, and the disclosure may be applied to various cases.

Figure 4A:
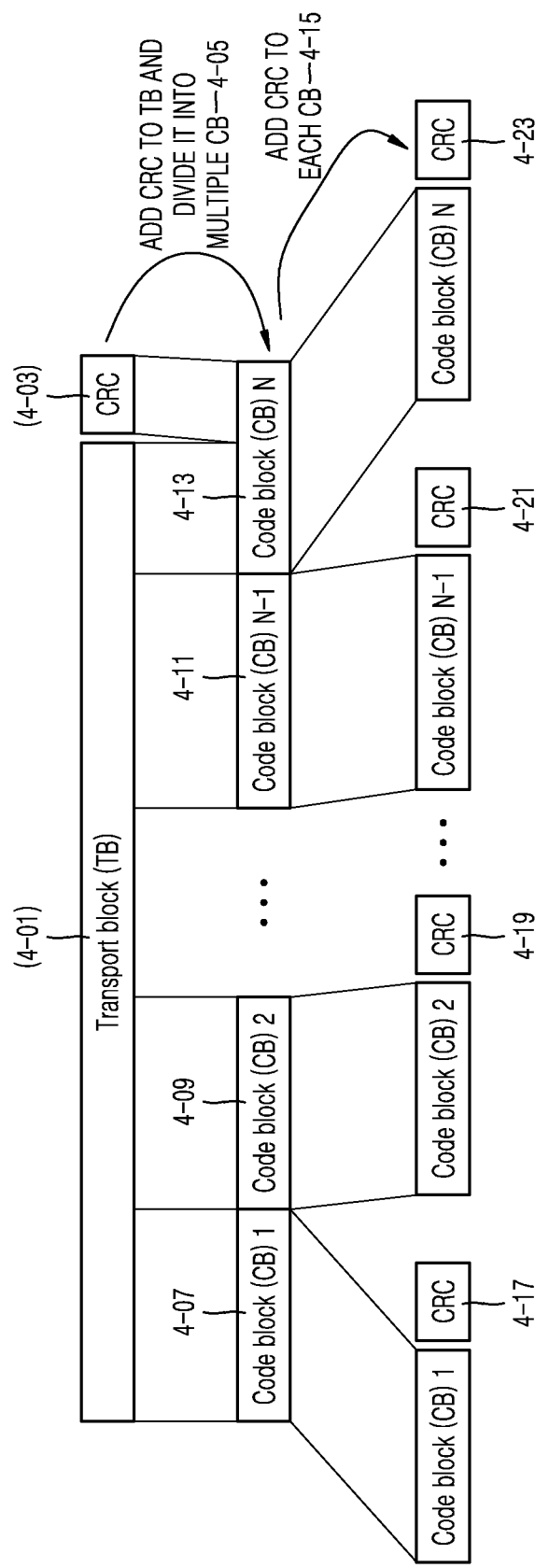
FIG. 4A is a diagram for describing a procedure in which a transport block is divided into multiple code blocks and cyclic redundancy check (CRC) is added thereto, according to an embodiment of the disclosure.

FIG. 4A is a diagram for describing a procedure in which a transport block is divided into multiple code blocks and cyclic redundancy check (CRC) is added thereto, according to an embodiment of the disclosure.

Referring to FIG. 4, CRC 4-03 may be added to the last or first portion of one transport block TB 4-01 to be transmitted in a UL or DL. The CRC 4-03 may be in 16 or 24 bits, or in a prefixed number of bits, or in a variable number of bits depending on the channel condition, and may be used to determine whether channel coding is successful. A block with the TB 4-01 and the CRC 4-03 added thereto may be divided into several code blocks CBs 4-07, 4-09, 4-11, and 4-13, in 4-05. Division into the code blocks may be made with a maximum size predetermined for the code block, in which case the last code block 4-13 may be smaller in size than the other code blocks 4-07, 4-09, and 4-11. It is, however, an example, and in another example, the last code block 4-13 and the other code blocks 4-07, 4-09, and 4-11 may have the same length by inserting 0 (s), a random value, or 1 (s) to the last code block 4-13. CRCs 4-17, 4-19, 4-21, and 4-23 may be added to the code blocks 4-07, 4-09, 4-11, and 4-13, respectively, in 4-15. The CRC may be in 16 or 24 bits, or in a prefixed number of bits, and may be used to determine whether channel coding is successful.

The TB 4-01 and a cyclic generator polynomial may be used to create the CRC 4-03, and the cyclic generator polynomial may be defined in various methods. For example, assuming that cyclic generator polynomial for 24 bit CRC, gCRC24A(D)=D24+D23+D18+D17+D14+D11+D10+D7+D6+D5+D4+D3+D+1, given L=24, CRC $p_0$, $p_1$, $p_2$, $p_3$, ..., $p_{L-1}$ for TB data $a_0$, $a_1$, $a_2$, $a_3$, ..., $a_{A-1}$ may be determined to be such a value that makes the remainder of division of $a_0 D^{A+23}+a_1 D^{A+22}+ \ldots +a_{A-1}D^{24}+p_0 D^{23}+p_1 D^{22}+ \ldots +p_{22}D^1+p_{23}$ by gCRC24A(D) zero. Although the CRC length L is assumed as 24 in the above example, the CRC length L may be determined to be a different length 12, 16, 24, 32, 40, 48, 64, etc.

After the CRC is added to the TB, the resultant TB may be divided into N CBs 4-07, 4-09, 4-11, and 4-13. The CRCs 4-17, 4-19, 4-21, and 4-23 may be added to the split CBs 4-07, 4-09, 4-11, and 4-13, respectively, in 4-15. The CRC added to the CB may have different length from the CRC added to the TB, or a different cyclic generator polynomial may be used for the CRC for the CB. Alternatively, the CRC 4-03 added to the TB and the CRCs 4-17, 4-19, 4-21, and 4-23 added to the code blocks may be omitted depending on a type of channel code to be applied to the code blocks. For example, when low density parity check (LDPC) codes are applied to the code blocks instead of turbo codes, the CRCs 4-17, 4-19, 4-21, and 4-23 that would otherwise be inserted to the code blocks may be omitted.

Alternatively, even when the LDPC is applied, the CRCs 4-17, 4-19, 4-21, and 4-23 may be added to the code blocks as they are. Moreover, even when polar codes are used, the CRCs may be added or omitted.

As described above in connection with FIG. 4A, for a TB to be transmitted, a maximum length of a code block may be determined based on a type of applied channel coding, and based on the maximum length of the code block, the TB and the CRC added to the TB may be divided into the code blocks.

In the LTE system, a CRC for CB may be added to the split CB, and coded bits may be determined by encoding data bits and the CRC of the CB with channel codes, and the number of bits to be rate-matched as agreed for the respective coded bits may be determined.

In an NR system, a size of the TB may be determined via the following steps:

Step 1: calculate the number of REs $N'_{RE}$ allocated for PDSCH mapping in a PRB in an allocated resource. $N'_{RE}$ may be calculated to be $N_{sc}^{RB} \cdot N_{symb}^{sh} - N_{DMRS}^{PRB} - N_{oh}^{PRB}$. $N_{sc}^{RB}$ is 12, and $N_{symb}^{sh}$ may represent the number of OFDM symbols allocated for the PDSCH. $N_{DMRS}^{PRB}$ is the number of REs in a PRB, which are occupied by DMRS of the same CDM group. $N_{oh}^{PRB}$ is the number of REs occupied by overhead in a PRB configured by higher signaling, which may be configured to be one of 0, 6, 12, and 18. Subsequently, a total number of REs $N_{RE}$ allocated for the PDSCH may be calculated. $N_{RE}$ is calculated to be $\min(156, N'_{RE}) \cdot n_{PRB}$, and $n_{PRB}$ represents the number of PRBs allocated for the UE.

Step 2: The number of arbitrary information bits $N_{info}$ may be calculated to be $N_{RE}*R*Q_m*v$. R denotes a code rate, and Qm denotes a modulation order, the information of which may be delivered in an MCS bit field in control information and using a table determined beforehand. Furthermore, v is the number of layers allocated. When $N_{info} \leq 3824$ the TBS may be calculated in the following step 3. Otherwise, the TBS may be calculated in step 4.

Step 3:

$$N'_{info} = \max\left(24, 2^n * \left\lfloor \frac{N_{info}}{2^n} \right\rfloor\right)$$

$N'_{info}$ may be calculated in formulas n=max(3,⌊log$_2$(N$_{info}$)⌋−6). The TBS may be determined to be a value nearest to $N'_{info}$ among values not smaller than $N'_{info}$ in the following Table 3.

TABLE 3

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |

TABLE 3-continued

| Index | TBS |
|---|---|
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4:

$$N'_{info} = \max\left(3840, 2^n \times \text{round}\left(\frac{N_{info} - 24}{2^n}\right)\right)$$

$N'_{info}$ may be calculated in formulas $n = \lfloor \log_2(N_{info} - 24) \rfloor - 5$. The TBS may be determined by value $N'_{info}$ and the following [pseudo-code 1].

[Start Pseudo-Code 1]

if $R \geq \frac{1}{4}$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
  if $N_{info}' > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if

[End Pseudo-Code 1]

In the NR system, when a CB is input to an LDPC encoder, it may be output with parity bits added thereto. In this case, an amount of the parity bits may vary depending on an LDCP base graph. A method by which to send all the parity bits generated by LDPC coding for a particular input may be called full buffer rate matching (FBRM), and a method by which to limit the number of parity bits available for transmission may be called limited buffer rate matching (LBRM). When resources are allocated for data transmission, an LDPC encoder output may be made as a circular buffer, and bits of the buffer may be repeatedly transmitted as many as the allocated resources, in which case a length of the circular buffer may be referred to as Ncb. Given that the number of all parity bits generated by LDPC coding is N, Ncb=N in the FBRM method. In the LBRM method, $N_{cb}$ may be min(N,$N_{ref}$), $N_{ref}$ may be given as $$\left\lfloor \frac{TBS_{LBRM}}{C \cdot R_{LBRM}} \right\rfloor,$$

and $R_{LBRM}$ may be determined to be $\frac{2}{3}$. $TBS_{LBRM}$ represents a maximum number of layers supported by the UE in the corresponding cell according to the aforementioned method of obtaining the TBS, and in a case that a maximum modulation order configured for the UE in the cell is not configured, 64QAM may be assumed with the code rate being the maximum code rate 948/1024, $N_{RE}$ being $156 \cdot n_{PRB}$, and $n_{PRB}$ being $n_{PRB,LBRM}$. $n_{PRB,LBRM}$ may be given in the following Table 4.

TABLE 4

| Maximum number of PRBs across all configured BWPs of a carrier | $n_{PRB, LBRM}$ |
|---|---|
| Less than 33 | 32 |
| 33 to 66 | 66 |
| 66 to 107 | 107 |
| 108 to 135 | 135 |
| 136 to 162 | 162 |
| 163 to 217 | 217 |
| Larger than 217 | 273 |

In the NR system, a peak data rate supported by the UE may be determined in Equation 1 below:

[Equation 1]

$$\text{data rate(in Mbps)} = 10^{-6} \cdot \sum_{j=1}^{J} \left( v_{Layers}^{(j)} \cdot Q_m^{(j)} \cdot f^{(j)} \cdot R_{\max} \cdot \frac{N_{PRB}^{BW(j),\mu} \cdot 12}{T_s^\mu} \cdot (1 - OH^{(j)}) \right)$$

In Equation 1, J may refer to the number of carriers grouped by carrier aggregation, Rmax=948/1024, $v_{Layers}^{(j)}$ may refer to the maximum number of layers, $Q_m^{(j)}$ may refer to a maximum demodulation order, $f^{(j)}$ may refer to a scaling index, and μ may refer to subcarrier spacing. $f^{(j)}$ may be reported by the UE as one of 1, 0.8, 0.75, and 0.4, and μ may be given in the following Table 5.

TABLE 5

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Furthermore, $T_s^\mu$ is an average OFDM symbol length, $T_s^\mu$ may be calculated as $$\frac{10^{-3}}{14 \cdot 2^\mu}, \text{ and } N_{PRB}^{BW(j),\mu}$$

is the maximum number of RBs in BW(j). OH(j) is an overhead value, which may be given as 0.14 for DL and 0.18 for UL in FR1 (a band equal to or less than 6 GHZ), and given as 0.08 for DL and 0.10 for UL in FR2 (a band higher than 6 GHZ). Peak data rates for DL in a cell having 100 MHz frequency bandwidth with 30 KHz subcarrier spacing may be calculated in Equation 1 as in the following Table 6.

TABLE 6

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that may be measured by the UE during actual data transmission may be a value obtained by dividing an amount of data by data transmission time. This may be a value obtained by dividing a TBS by TTI length in 1-TB transmission, and a sum of TBSs by TTI length in 2-TB transmission. For example, actual peak data rates for DL in the cell having 100 MHz frequency bandwidth with 30 kHz subcarrier spacing as in Table 6 may be determined as in the following Table 7 based on the number of allocated PDSCH symbols.

TABLE 7

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The peak data rates supported by the UE may be seen in Table 6, and the actual data rates based on the allocated TBS may be seen in Table 7. According to scheduling information, the actual data rate may sometimes be higher than the peak data rate.

In a wireless communication system, the new radio (NR) system in particular, data rates supported by the UE may be agreed between the BS and the UE. It may be calculated using a maximum frequency band, a maximum modulation order, the maximum number of layers, etc., which are supported by the UE. However, the calculated data rate may be different from a value calculated from the transport block size (TBS) and transmission time interval (TTI) of a transport block (TB) used for actual data transmission.

Hence, it may happen for the UE to be allocated a TBS greater than a value corresponding to the data rate supported by the UE itself, and to prevent this, there may be constraints on the TBS that may be scheduled, depending on the data rate supported by the UE.

As the UE is generally separated from a BS, a signal transmitted from the UE may be received by the BS with a propagation delay. The propagation delay is a value obtained by dividing a path a radio wave is propagated from the UE to the BS by the speed of light, and may generally be a value obtained by dividing a distance from the UE to the BS by the speed of light. For example, in a case of a UE located 100 km away from a BS, a signal transmitted from the UE may be received by the BS after about 0.34 msec. Even a signal transmitted from the BS may also be received by the UE after about 0.34 msec. As described above, depending on the distance between the UE and the BS, the time taken for a signal transmitted from the UE to arrive at the BS may vary. Accordingly, when multiple UEs placed in different locations simultaneously transmit signals, times taken for the signals to arrive at the BS may be different from each other. To address this phenomenon and make the signals transmitted from the multiple UEs simultaneously arrive at the BS, the respective UEs may have different transmission timing. This is called timing advance in the 5G, NR, and LTE system. A processing time of a UE based on the timing advance will be described later in connection with FIG. 8.

Figure 4B:
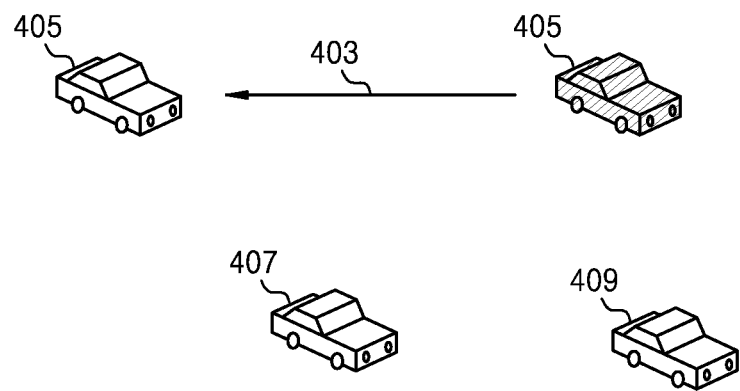
FIG. 4B is a diagram for describing point-to-point communication between two user equipments (UEs) through sidelinks, according to an embodiment of the disclosure.

FIG. 4B is a diagram for describing point-to-point communication between two user equipments (UEs) through sidelinks, according to an embodiment of the disclosure.

Specifically, referring to FIG. 4B, point-to-point communication between two UEs 401 and 405, i.e., unicast communication, which is performed in a sidelink, will be described.

In FIG. 4B, an example in which a signal is transmitted from the first UE 401 to the second UE 405, is shown, but the signal transmission may be in the opposite direction. That is, the signal may be transmitted from the second UE 405 to the first UE 401. Other UEs 407 and 409 than the first and second UEs 401 and 405 are unable to receive a signal transmitted by unicast communication between the first and second UEs 401 and 405. Signal transmission or reception by the unicast communication between the first and second UEs 401 and 405 may be comprised of processes of scrambling mapped in a resource or using a value agreed between the first and second UEs 401 and 405, control information mapping, data transmission using a value configured between them, checking unique ID values between them, etc. The UEs may be moving terminals such as vehicles. Extra control information, a physical control channel, or data may be transmitted for unicast communication.

Figure 4C:
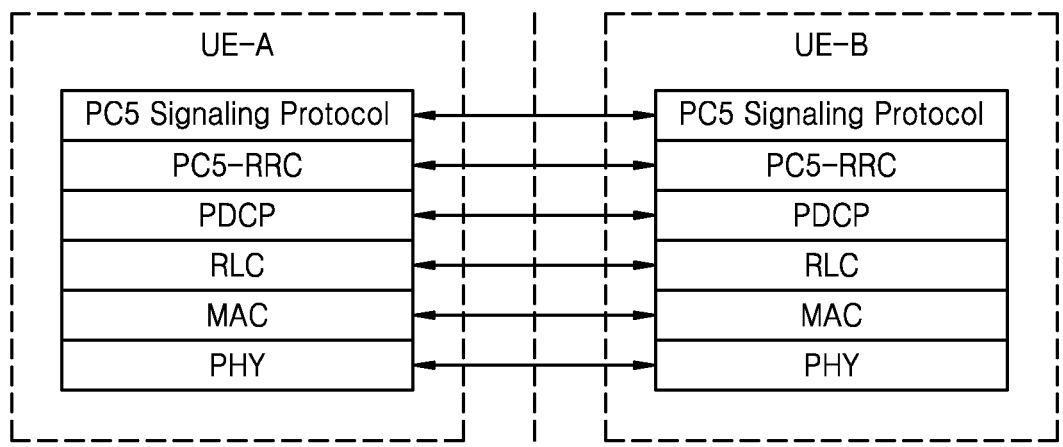
FIG. 4C is a diagram illustrating a protocol for sidelink UEs, according to an embodiment of the disclosure.

FIG. 4C is a diagram illustrating a protocol for sidelink UEs, according to an embodiment of the disclosure.

Although not shown in FIG. 4C, application layers of UE-A and UE-B may perform service discovery. In this case, the service discovery may include discovering which types of sidelink communication (unicast, groupcast, or broadcast) will be performed by each UE. Accordingly, in FIG. 4C, it may be assumed that UE-A and UE-B recognize from the service discovery process that they will perform the unicast communication scheme. The sidelink UEs may obtain information about a source identifier (ID) and a destination ID for sidelink communication in the aforementioned service discovery process.

Once the service discovery process is completed, PC-5 signaling protocol layers shown in FIG. 4C may perform a direct link connection setup procedure between the UEs. In this case, UE-A and UE-B may exchange security configuration information for direction communication between the UEs. Once the direct link connection setup is completed between the UEs, a PC-5 radio resource control (RRC) setup procedure may be performed in PC-5 RRC layers of FIG. 4C between the UEs. In this case, information about capabilities of UE-A and UE-B may be exchanged, and access stratum layer parameter information for unicast communication may be exchanged.

Once the PC-5 RRC setup procedure is completed, UE-A and UE-B may perform unicast communication.

Although the disclosure is focused on the unicast communication as an example, it may be expanded to groupcast communication. For example, when UE-A, UE-B, and UE-C (not shown) are involved in groupcast communication, UE-A and UE-B may perform service discovery, direct link setup between UEs, and a PC-5 RRC setup procedure for unicast communication, as described above. Furthermore, UE-A and UE-C may also perform service discovery, direct link setup between UEs, and a PC-5 RRC setup procedure for unicast communication. Finally, UE-B and UE-C may perform service discovery, direct link setup between UEs, and a PC-5 RRC setup procedure for unicast communication. In other words, a separate PC-5 RRC setup procedure for groupcast communication is not performed, but a PC-5 RRC setup procedure for unicast communication may be performed between each pair of a transmitting UE and a receiving UE involved in the groupcast communication.

Figure 5:
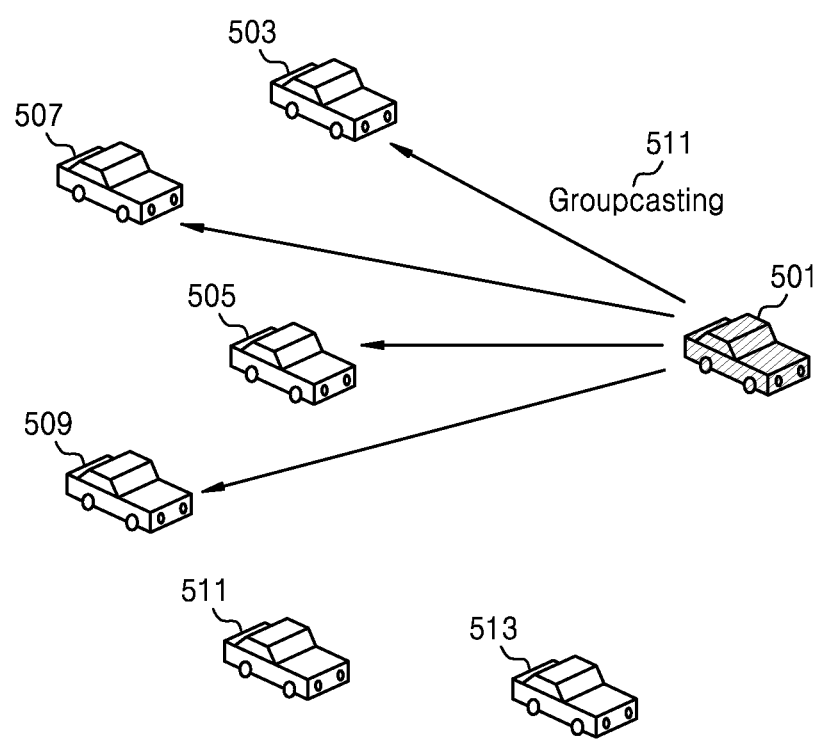
FIG. 5 is a diagram for describing groupcast communication, by which a UE transmits common data to a plurality of UEs through sidelinks, according to an embodiment of the disclosure.

FIG. 5 is a diagram for describing groupcast communication, by which a UE transmits common data to a plurality of UEs through sidelinks, according to an embodiment of the disclosure.

Specifically, referring to FIG. 5, groupcast communication 511 may be performed, by which a UE 501 transmits common data to a plurality of UEs 503, 505, 507, and 509 through sidelinks.

In FIG. 5, the first UE 501 may transmit a signal to other UEs 503, 505, 507, and 509 in a group, and UEs 511 and 513 not included in the group may not receive signals transmitted for groupcasting.

A UE transmitting a signal for groupcasting may be another UE in the group, and resource allocation for the signal transmission may be provided by a BS or a UE which plays a leading role in the group, or selected the UE itself that transmits the signal. The UEs may be moving terminals such as vehicles. Extra control information, a physical control channel, or data may be transmitted for groupcasting.

Figure 6:
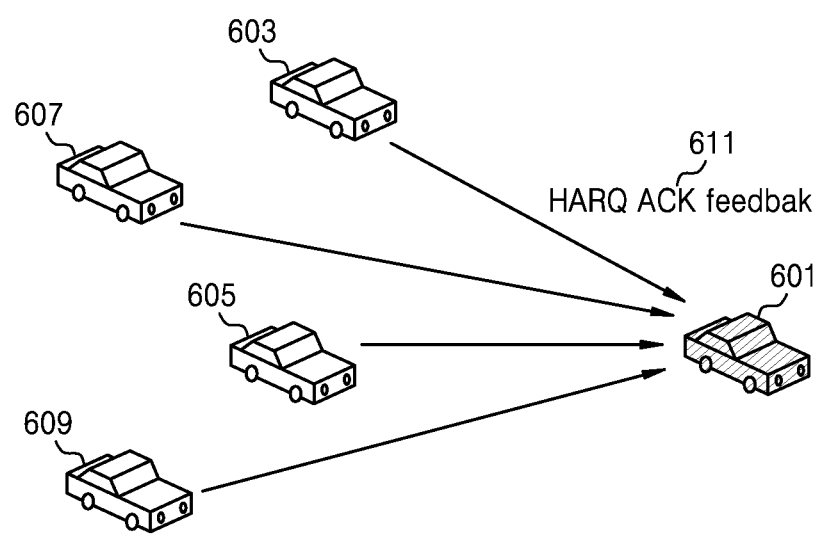
FIG. 6 is a diagram for describing a procedure in which receiving UEs transmit information relating to data reception to a transmitting UE, according to an embodiment of the disclosure.

FIG. 6 is a diagram for describing a procedure in which receiving UEs transmit information relating to data reception to a transmitting UE, according to an embodiment of the disclosure.

Specifically, referring to FIG. 6, the UEs 603, 605, 607, and 609 having received common data through groupcasting may transmit information relating to a success or failure in data reception to the UE 601 which had transmitted the data. The information relating to the success or failure in data reception may be HARQ-ACK feedback information 611. Furthermore, the UEs may have LTE based sidelink or NR based sidelink functions. A UE having only the LTE based sidelink function may not be able to transmit or receive an NR based sidelink signal and physical channel. In the disclosure, sidelink may be interchangeably used with PC5, V2X or D2D. Although transmission or reception in groupcasting according to an embodiment of the disclosure are described with reference to FIGS. 5 and 6, it may be applied equally to unicast signal transmission or reception between UEs.

Figure 7:
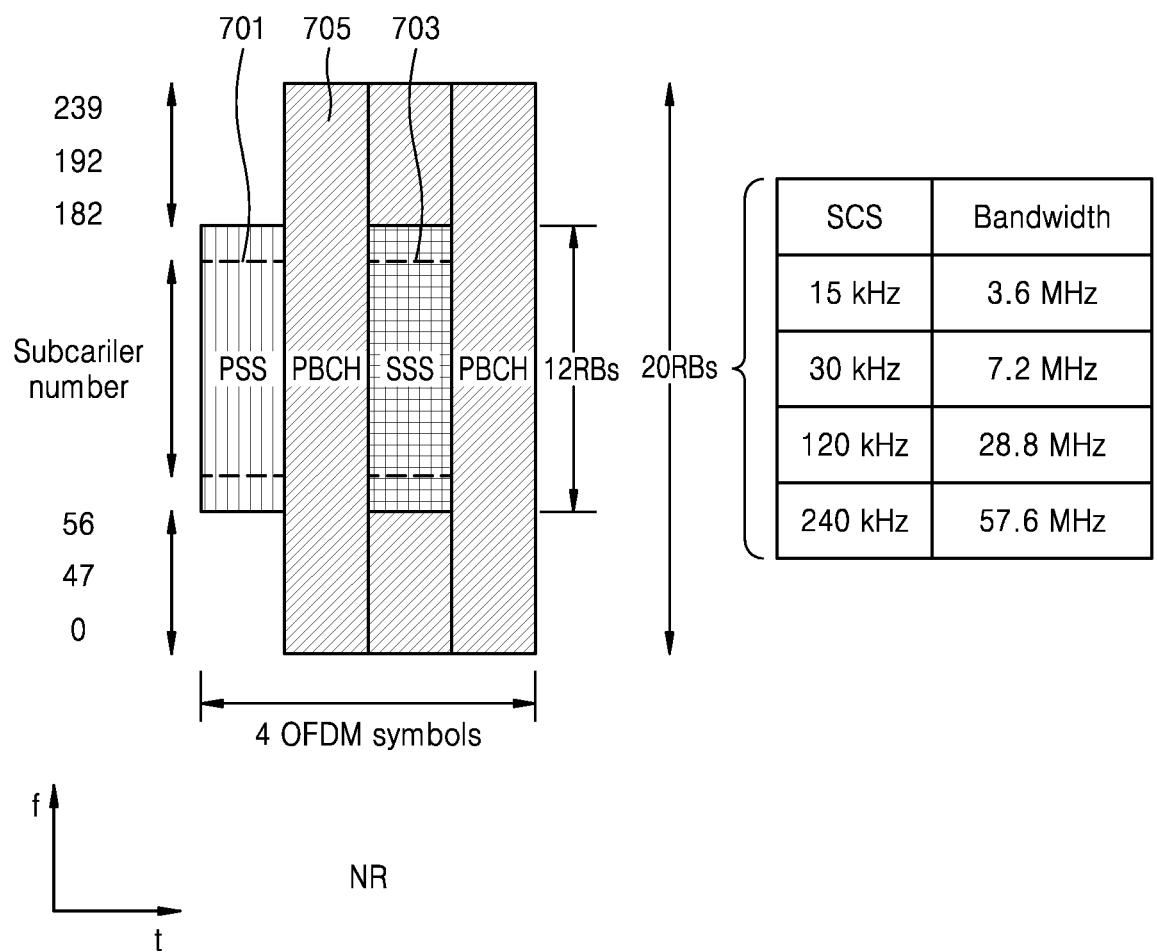
FIG. 7 is a diagram illustrating a synchronization signal (SS) and a physical broadcast channel (PBCH) of an NR system mapped in the frequency and time domain, according to an embodiment of the disclosure.

FIG. 7 is a diagram illustrating a synchronization signal (SS) and a physical broadcast channel (PBCH) of an NR system mapped in the frequency and time domain, according to an embodiment of the disclosure.

A primary synchronization signal (PSS) 701, a secondary synchronization signal (SSS) 703, and a PBCH 705 may be mapped to 4 OFDM symbols, in which case the PSS and the SSS may be mapped to 12 RBs and the PBCH may be mapped to 20 RBs. How a frequency band of 20 RBs is changed depending on subcarrier spacing (SCS) is represented in a table of FIG. 7. A resource region in which the PSS 701, the SSS 703, and the PBCH 705 are transmitted may be referred to as an SS/PBCH block. Furthermore, the SS/PBCH block may be referred to as an SSB block.

Figure 8:
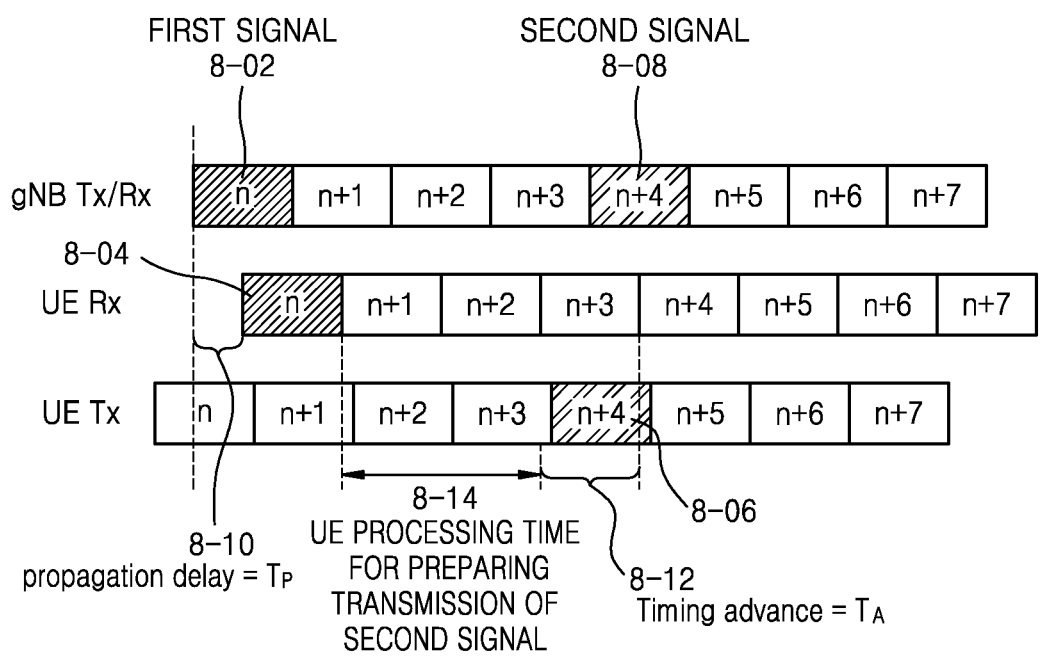
FIG. 8 is a diagram for describing a timing advance based processing time of a UE, according to an embodiment of the disclosure.

FIG. 8 is a diagram for describing a timing advance based processing time of a UE, according to an embodiment of the disclosure.

Specifically, FIG. 8 is a diagram for describing a processing time of a UE based on timing advance, when the UE receives a first signal and in response, transmits a second signal in a 5G or NR system, according to an embodiment of the disclosure.

Referring to FIG. 8, when the BS transmits a UL scheduling grant, or a DL control signal and data to the UE in slot n 8-02, the UE may receive the UL scheduling grant, or the DL control signal and data in the slot n 8-04. In this case, the reception at the UE may be delayed by a propagation delay TP 8-10 from the transmission time at the BS. In the embodiment, when the UE receives a first signal in the slot n 8-04, the UE transmits a corresponding second signal in slot n+4 8-06. Even when the UE transmits a signal to the BS, the UE may transmit UL data or HARQ ACK/NACK for DL data at a time 8-06 advanced by timing advance TA 8-12 from the slot n+4 based on the signal received by the UE in order to make the signal arrive at the BS at a particular time. Accordingly, in an embodiment of the disclosure, time 8-14 for the UE to prepare to transmit UL data after receiving a UL scheduling grant or to deliver HARQ ACK or NACK after receiving DL data may be a period of time corresponding to three slots except for TA.

To determine the timing, the BS may calculate an absolute value of TA of the corresponding UE. When initially accessed by the UE, the BS may calculate the absolute value of TA by adding to or subtracting from a value of TA delivered to the UE for the first time in a random access process an amount of change in the value of TA subsequently delivered by higher layer signaling. In an embodiment of the disclosure, the absolute value of TA may be a value resulting from subtracting a start time of the n-th TTI received by the UE from a start time of the n-th TTI transmitted by the UE.

In the meantime, one of important factors for cellular wireless communication system capabilities is packet data latency. For this, in the LTE system, a signal may be transmitted or received in the unit of a subframe having a transmission time interval (TTI) of 1 ms. The LTE system operating as described above may support a UE having a TTI shorter than 1 ms (short-TTI UE). On the other hand, in the 5G or NR system, a TTI may be shorter than 1 ms. The short-TTI UE may be suitable for services such as a voice over LTE VOLTE) service for which latency is important or a remote control service. The short-TTI UE may substantialize cellular based mission-critical Internet of Things (IoT).

In the 5G or NR system, when the BS transmits a PDSCH including DL data, DCI that schedules the PDSCH may indicate a K1 value corresponding to timing information at which the UE transmits HARQ-ACK information for the PDSCH. Unless the HARQ-ACK information is indicated to be transmitted earlier than symbol L1 with timing advance included, the UE may transmit the HARQ-ACK information to the BS. In other words, the HARQ-ACK information may include timing advance and may be transmitted from the UE to the BS at the same timing as or later than the symbol L1. When the HARQ-ACK information includes the timing advance and is indicated to be transmitted earlier than the symbol L1, the HARQ-ACK information indicated may not be valid HARQ-ACK information from the UE to the BS. The symbol L1 may be the first symbol in which cycle prefix (CP) starts after $T_{proc,1}$ from the last point in time of the PDSCH. $T_{proc,1}$ may be calculated as in Equation 2 below:

$$T_{proc,1} = ((N_1 + d_{1,1} + d_{1,2})(2048 + 144) \cdot \kappa 2^{-\mu}) \cdot T_C \quad \text{[Equation 2]}$$

In Equation 2 described above, N1, d1,1, d1,2, κ, μ and TC may be defined as follows:
- d1,1=0 when HARQ-ACK information is transmitted on a PUCCH (UL control channel), and d1,1=1 when HARQ-ACK information is transmitted on a PUSCH (UL shared channel, data channel).
- when the UE is configured with a plurality of active configuration carriers or carriers, a maximum timing difference between the carriers may be reflected in transmission of the second signal.
- for the PDSCH mapping type A, i.e., in a case that the first DMRS symbol is positioned in the third or fourth symbol of a slot, when the position index i of the last symbol of the PDSCH is smaller than 7, d1,2 is defined to be 7−i.
- for the PDSCH mapping type B, i.e., in a case that the first DMRS symbol is positioned in the first symbol of the PDSCH, d1,2=3 when the PDSCH has the length of 4 symbols, or d1,2=3+d when the PDSCH has the length of 2 symbols, where d is the number of overlapping OFDM symbols between the PDSCH and a PDCCH including a control signal for scheduling the PDSCH.

N1 is defined according to u as in the following Table 8. μ=0, 1, 2, and 3 refer to subcarrier spacing 15 kHz, 30 kHz, 60 kHz, and 120 kHz, respectively.

TABLE 8

| | PDSCH decoding time) $N_1$ [symbols] | |
|---|---|---|
| μ | No additional PDSCH DM-RS configured | Additional PDSCH DM-RS configured |
| 0 | 8 | 13 |
| 1 | 10 | 13 |
| 2 | 17 | 20 |
| 3 | 20 | 24 | for the value of N1 presented in Table 8, different values may be used depending on the UE capability.

$$T_c = 1/(\Delta f_{max} \cdot N_f), \Delta f_{max} = 480 \cdot 10^3 \text{ Hz}, N_f = 4096, \kappa = T_s/T_c = 64, T_s = 1/(\Delta f_{ref} \cdot N_{f,ref}), \Delta f_{ref} = 15 \cdot 10^3 \text{ Hz}, N_{f,ref} = 2048$$

is defined.

Furthermore, in the 5G or NR system, when the BS transmits control information including a UL scheduling grant, the UE may indicate a value of K2 corresponding to information of timing at which the UE transmits UL data or a PUSCH.

Unless the PUSCH is indicated to be transmitted earlier than symbol L2 with timing advance included, the UE may transmit the PUSCH to the BS. In other words, the PUSCH may be transmitted from the UE to the BS at the same timing as or later than the symbol L2 with the timing advance included. When the PUSCH is indicated to be transmitted earlier than symbol L2 with the timing advance included, the UE may ignore the UL scheduling grant control information from the BS. The symbol L2 may be the first symbol in which cycle prefix (CP) of a PUSCH symbol to be transmitted starts after $T_{proc,2}$ from the last point in time of the PDCCH including the scheduling grant. $T_{proc,2}$ may be calculated as in Equation 3 below:

$$T_{proc,2} = ((N_2 + d_{2,1})(2048 + 144) \cdot \kappa 2^{-\mu}) \cdot T_C \quad \text{[Equation 3]}$$

In Equation 3 described above, N2, d2,1, κ, μ, and TC may be defined as follows:
- when the first of symbols allocated the PUSCH includes only a DMRS, d2,1=0, and otherwise, d2,1=1.
- when the UE is configured with a plurality of active configuration carriers or carriers, a maximum timing difference between the carriers may be reflected in transmission of the second signal.

N2 is defined according to u as in the following Table 9. μ=0, 1, 2, and 3 refer to subcarrier spacing 15 kHz, 30 kHz, 60 kHz, and 120 kHz, respectively.

TABLE 9

| μ | PUSCH preparation time $N_2$ [symbols] |
|---|---|
| 0 | 10 |
| 1 | 12 |
| 2 | 23 |
| 3 | 36 | for the value of N2 presented in Table 9, different values may be used depending on the UE capability.

$T_c=1/(\Delta f_{max} \cdot N_f)$, $\Delta f_{max}=480 \cdot 10^3$ Hz, $N_f=4096$, $\kappa=T_s/T_c=64$, $T_s=1/(\Delta f_{ref} \cdot N_{f,ref})$, $\Delta f_{ref}=15 \cdot 10^3$ Hz, $N_{f,ref}=2048$ is defined.

In the meantime, in the 5G or NR system, a frequency bandwidth part (BWP) may be configured in a carrier, and a particular UE may be designated to perform transmission or reception in the configured BWP. This may aim at reducing power consumption of the UE. The BS may configure a plurality of BWPs, and switch an active BWP in the control information. Time used by the UE to switch the BWP may be defined as in the following Table 10.

TABLE 10

| Frequency Range | Scenario | Type 1 Delay (us) | Type 2 Delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 10, frequency range 1 refers to a range of frequencies equal to or lower than 6 GHZ, and frequency range 2 refers to a range of frequencies higher than 6 GHz. In the embodiment of the disclosure, type 1 and type 2 may be determined based on UE capabilities. In the embodiment of the disclosure, scenarios 1, 2, 3, and 4 are given as in the following Table 11.

TABLE 11

|  | Center frequency changed | Center frequency not changed |
|---|---|---|
| Frequency bandwidth changed | Scenario 3 | Scenario 2 |
| Frequency bandwidth not changed | Scenario 1 | Scenario 4 when subcarrier spacing is changed |

Figure 9A:
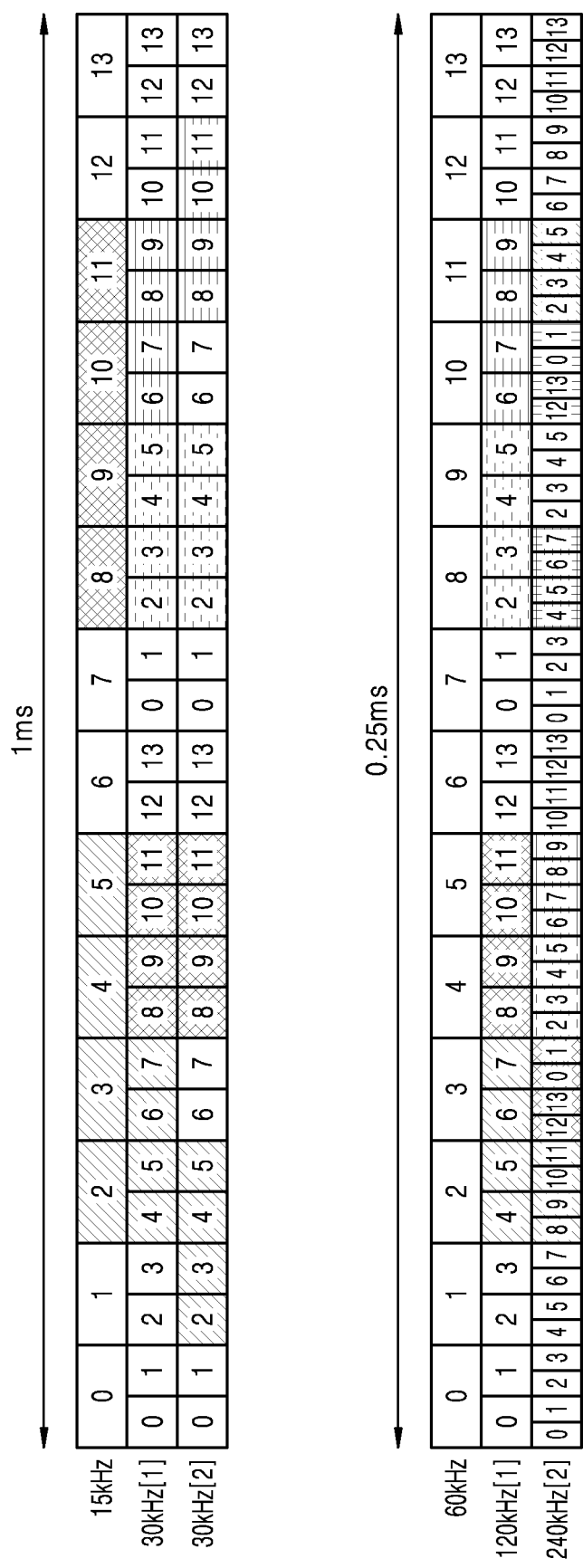
FIG. 9A is a diagram illustrating symbols in which an SS/PBCH block may be transmitted depending on subcarrier spacing, according to an embodiment of the disclosure.

FIG. 9A is a diagram illustrating symbols in which an SS/PBCH block may be transmitted depending on subcarrier spacing, according to an embodiment of the disclosure.

Specifically, referring to FIG. 9A, which symbols an SS/PBCH block is mapped to is illustrated.

Referring to FIG. 9A, an example of the existing LTE system using 15 kHz subcarrier spacing and an NR system using 30 kHz subcarrier spacing is shown, in which case SS/PBCH blocks of the NR system are designed to be transmitted at positions that may avoid cell-specific reference signals (CRSs) always transmitted in the LTE system. This is to make the LTE system and the NR system coexist in a frequency band.

FIG. 9A is a diagram illustrating symbols in which an SS/PBCH block may be transmitted depending on subcarrier spacing, according to an embodiment of the disclosure.

Referring to FIG. 9A, the subcarrier spacing may be set to 15 kHz, 30 kHz, 120 KHz, 240 kHz, etc., and depending on the respective subcarrier spacing, symbol positions where an SS/PBCH block (or SSB block) may be located may be determined. Referring to FIG. 9, positions of symbols within 1 ms, in which an SSB may be transmitted depending on the subcarrier spacing, are shown, but the SSB needs not to be always transmitted in the marked regions. Hence, the positions where the SSB block is transmitted may be configured for the UE through system information or dedicated signaling.

Figure 9B:
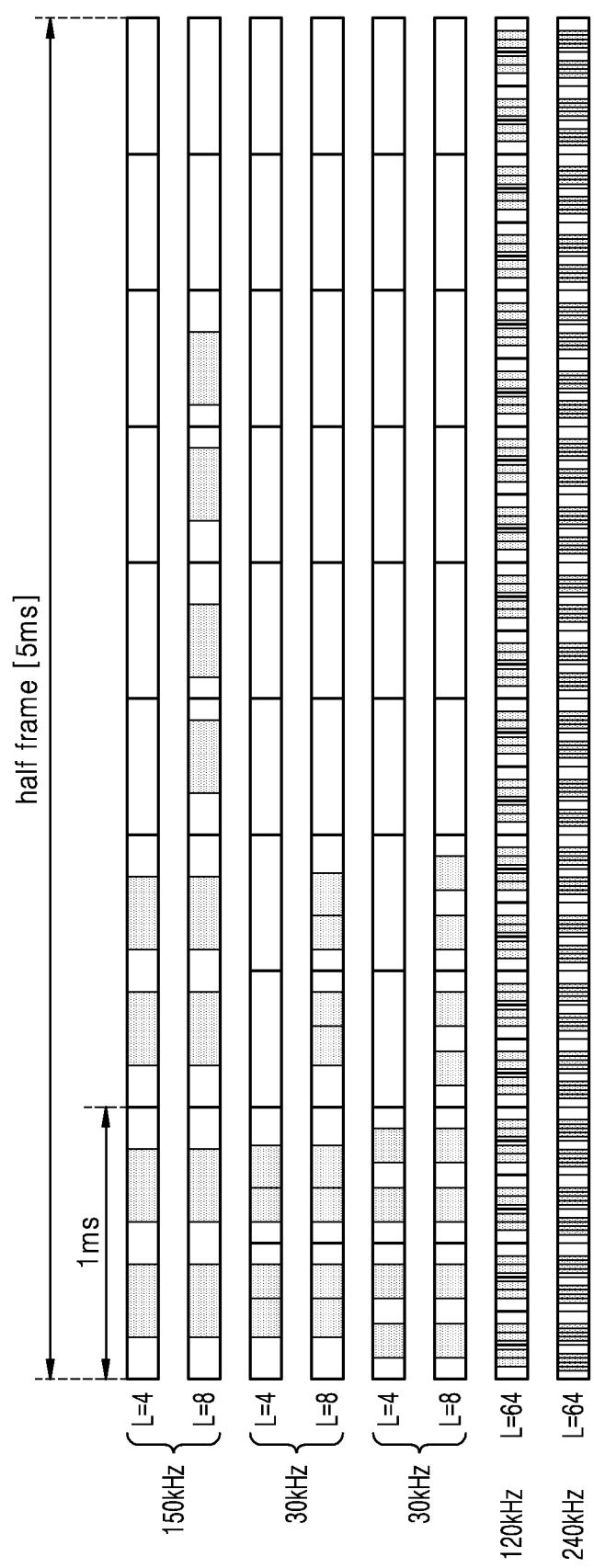
FIG. 9B is another diagram illustrating symbols in which an SS/PBCH block may be transmitted depending on subcarrier spacing, according to an embodiment of the disclosure.

FIG. 9B is another diagram illustrating symbols in which an SS/PBCH block may be transmitted depending on subcarrier spacing.

Referring to FIG. 9B the subcarrier spacing may be set to 15 kHz, 30 KHz, 120 KHz, 240 kHz, etc., and depending on the respective subcarrier spacing, symbol positions where an SS/PBCH block (or SSB block) may be located may be determined. FIG. 9B illustrates positions of symbols within 5 ms, where an SSB block may be transmitted depending on subcarrier spacing, and the positions where the SSB block is transmitted are configured for the UE through system information or dedicated signaling. An SS/PBCH block needs not to be always transmitted in the region where the SS/PBCH block is allowed to be transmitted, and may or may not be transmitted according to the BS's selection. In other words, the positions where the SSB block is transmitted may be configured for the UE through system information or dedicated signaling.

Figure 10:
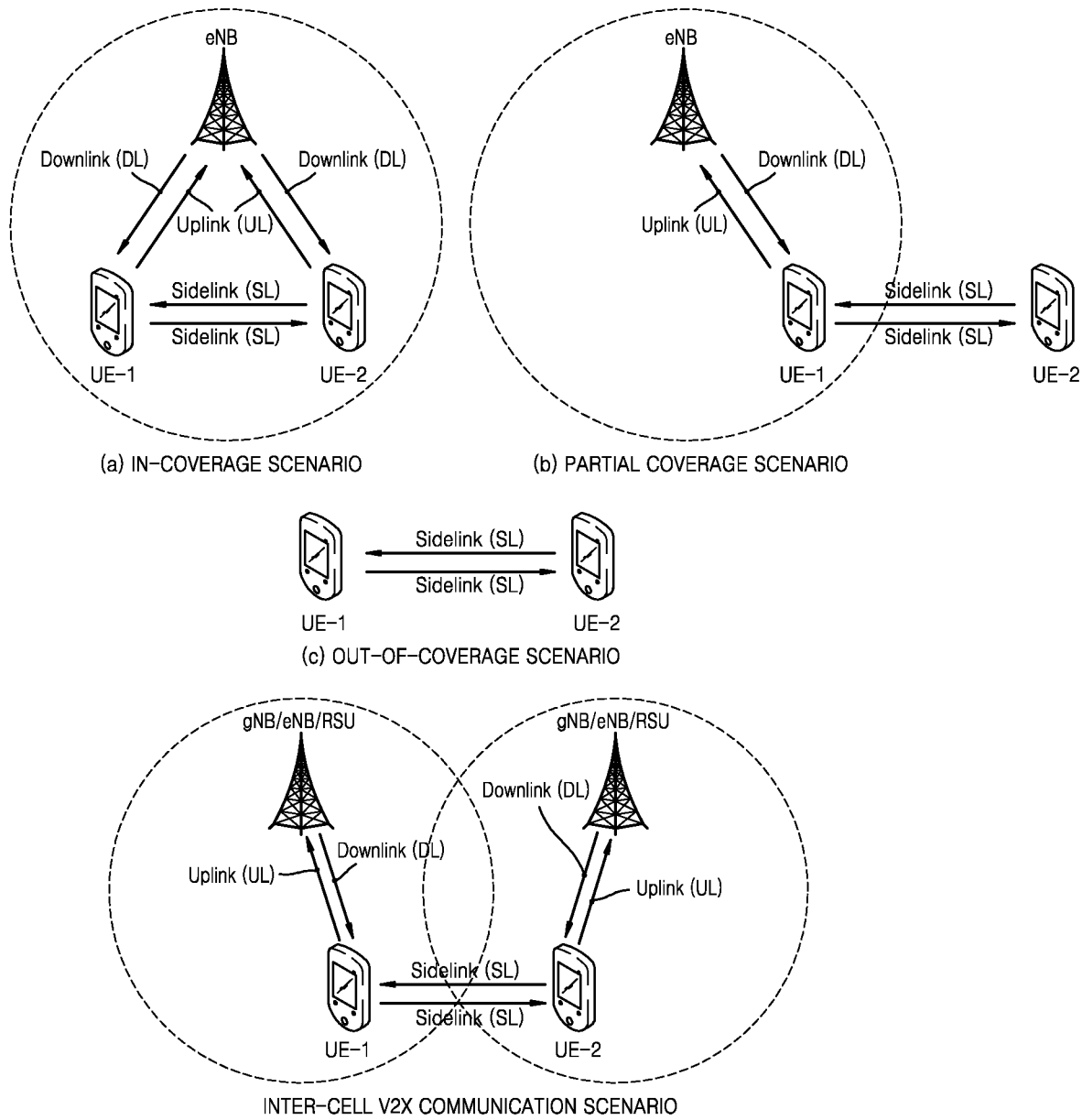
FIG. 10 illustrates a system, according to an embodiment of the disclosure.

FIG. 10 illustrates a system, according to an embodiment of the disclosure.

Referring to (a) of FIG. 10, a case that all V2X UEs (UE-1 and UE-2) are located in the coverage of a BS (gNB/eNB/RSU) is illustrated (in-coverage scenario). All the V2X UEs (UE-1 and UE-2) may receive data and control information from the BS (gNB/eNB/RSU) in a downlink (DL), or transmit data and control information to the BS in an uplink (UL). In this case, the data and control information may be data and control information for V2X communication, or data and control information for common cellular communication. Furthermore, in (a) of FIG. 10, the V2X UEs (UE-1 and UE-2) may transmit or receive data and control information for V2X communication in sidelinks (SLs).

Referring to (b) of FIG. 10, a case that, of the V2X UEs, UE-1 is located in the coverage of a BS (gNB/eNB/RSU) and UE-2 is located out of the coverage of the BS (gNB/eNB/RSU) is illustrated. Referring to (b) of FIG. 10, the UE (UE-1) located in the coverage of the BS is able to receive data and control information from the BS in a DL or transmit data and control information to the BS in a UL. Referring to (b) of FIG. 10, the UE (UE-2) located out of the coverage of the BS is not able to receive data and control information from the BS in a DL nor transmit data and control information to the BS in a UL. The UE (UE-2) is able to transmit or receive data and control information for V2X communication to or from a UE (UE-1) in sidelinks (SLs).

(C) of FIG. 10 illustrates a case that all V2X UEs (UE-1 and UE2) are located out of the coverage of a BS (gNB/eNB/RSU). Referring to (c) of FIG. 10, UEs (UE-1 and UE-2) are unable to receive data and control information from the BS in a DL nor transmit data and control information to the BS in a UL. On the other hand, a UE (UE-1)

and another UE (UE-2) are able to transmit or receive data and control information for V2X communication in sidelinks (SLs).

(D) of FIG. 10 illustrates a V2X transmitting UE and a V2X receiving UE connected to (in an RRC connected state) or camped in (in an RRC disconnected state, i.e., RRC idle state) different BSs (gNBs/eNBs/RSUs) (inter-cell V2X communication). In this case, the UE (UE-1) may be the V2X transmitting UE, and the UE (UE-2) may be the V2X receiving UE. Alternatively, the UE (UE-1) may be the V2X receiving UE, and the UE (UE-2) may be the V2X transmitting UE. The UE (UE-1) may receive a V2X dedicated system information block (SIB) from the BS to which the UE (UE-1) is connected (or in which the UE (UE-1) is camped), and the UE (UE-2) may receive a V2X dedicated SIB from the other BS to which the UE-2 is connected (or in which the UE (UE-2) is camped). In this case, information of the V2X dedicated SIB received by the UE (UE-1) and information of the V2X dedicated SIB received by the UE (UE-2) may be different from each other. Hence, it is required to unify the received SIB information to perform V2X communication between UEs located in different cells.

Although a V2X system comprised of e.g., two UEs (UE-1 and UE-2) is described in connection with FIG. 10 for convenience of explanation, it is not limited thereto and a different number of UEs may be involved in the V2X system. UL and DL between the BS(s) (eNB/gNB/RSU) and V2X UEs (UE-1 and UE-2) may be called a Uu interface, and a sidelink (SLs) between the V2X UEs (UE-1 and UE-2) may be called a PC5 interface. These may be interchangeably used in the disclosure.

In the meantime, in the disclosure, the UE may refer to a vehicle that supports vehicle-to-vehicle (V2V) communication, a vehicle or a handset (e.g., a smartphone) of a pedestrian that supports vehicle-to-pedestrian (V2P) communication, a vehicle that supports a vehicle-to-network (V2N) communication, or a vehicle that supports vehicle-to-infrastructure (V2I) communication. Furthermore, in the disclosure, the UE may refer to a road side unit (RSU) equipped with a UE function, an RSU equipped with a BS function, or an RSU equipped with part of the BS function and part of the UE function.

In the disclosure, a sidelink control channel may be called a physical sidelink control channel (PSCCH), and a sidelink shared channel or data channel may be called a physical sidelink shared channel (PSSCH). A broadcast channel broadcast along with a synchronization signal may be called a physical sidelink broadcast channel (PSBCH), and a channel for feedback transmission may be called a physical sidelink feedback channel (PSFCH). For the feedback transmission, however, the PSCCH or PSSCH may be used. Depending on the communication system, it may be called an LE-PSCCH, an LTE-PSSCH, an NR-PSCCH, an NR-PSSCH, etc. In the disclosure, the term sidelink may refer to a link between UEs, and the term Uu link may refer to a link between a BS and a UE.

Figure 11:
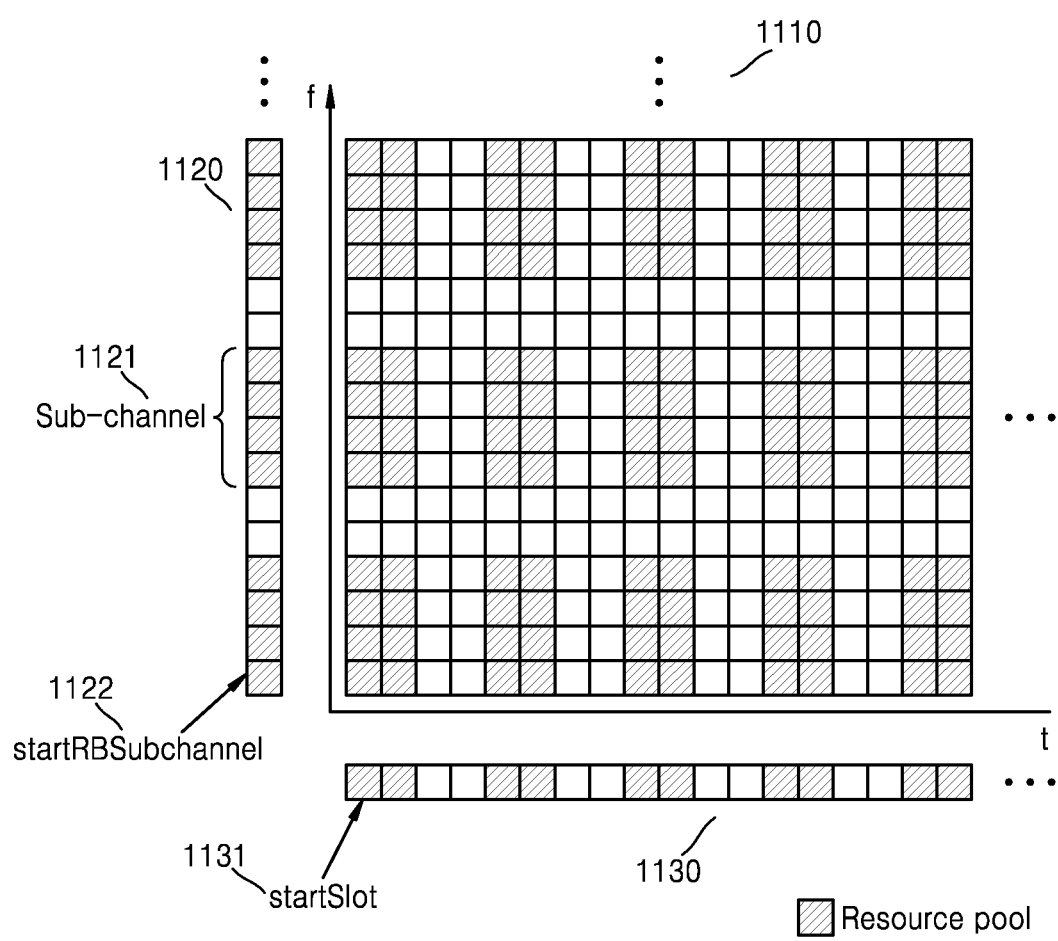
FIG. 11 is a diagram for describing a resource pool defined as a set of resources in time and frequencies used for sidelink transmission and reception, according to an embodiment of the disclosure.

FIG. 11 is a diagram for describing a resource pool defined as a set of resources in time and frequencies used for sidelink transmission and reception, according to an embodiment of the disclosure.

Referring to 1110 of FIG. 11, an occasion when resource pools are non-successively allocated in time and frequencies is illustrated. The disclosure is focused on an occasion when the resource pools are non-successively allocated in frequencies, but it is, of course, possible to allocate the resource pools successively in frequencies.

Referring to 1120 of FIG. 11, resources may be allocated non-successively in frequencies. A granularity of resource allocation in frequencies may be a physical resource block (PRB).

Referring to 1121 of FIG. 11, resource allocation in frequencies may be performed on a sub-channel basis. A sub-channel may be defined as a resource allocation granularity in frequencies, which is comprised of a plurality of RBs. Specifically, the sub-channel may also be defined as integer multiple RBs. Referring to 1121 of FIG. 11, an occasion when the sub-channel has a size of four successive PRBs. The size of the sub-channel may be differently set, and it is common but not necessary for one sub-channel to have successive PRBs. A sub-channel may be a basic unit for resource allocation for a PSSCH or a PSCCH, and the size of the sub-channel may be differently set depending on whether the channel is a PSSCH or a PSCCH. Furthermore, it is noted that the sub-channel may be referred to as a resource block group (RBG). Methods of allocating non-successive resource pools in frequencies and dividing the allocated resource pools into multiple sub-channels will now be described.

Referring to 1122 of FIG. 11, startRBSubchanel may indicate a start position of a sub-channel in frequencies in the resource pools.

A resource block, which is a frequency resource belonging to a resource pool for a PSSCH in an LTE V2X system, may be determined in the following method.

The resource block pool consists of $N_{subCH}$ sub-channels where $N_{subCH}$ is given by higher layer parameter numSubchannel.

The sub-channel m for m=0, 1, ..., $N_{subCH}-1$ consists of a set of $n_{subCHsize}$ contiguous resource blocks with the physical resource block number $n_{PRB}=n_{subCHRBstart}+m*n_{subCHsize}+j$ for j=0, 1, ..., $n_{subCHsize}-1$ where $n_{subCHRBstart}$ and $n_{subCHsize}$ are given by higher layer parameters startRBSubchannel and sizeSubchannel, respectively When $N_{subCH}$ is given by higher layer parameter numSubchannel, resource block pool is comprised of $N_{subCH}$ subchannels $n_{subCHRBstart}$ and $n_{subCHsize}$ are given by startRBSubchannel and sizeSubchannel, respectively, subchannel m for m=0, 1, ..., $N_{subCH}-1$ is comprised of successive resource blocks $n_{subCHsize}$ for the number of physical resource blocks j=0, 1, ..., $n_{subCHsize}-1$, $n_{PRB}=n_{subCHRBstart}+m*n_{subCHsize}+j$ 1130 of FIG. 11 shows non-successive resource allocation in time. A granularity of resource allocation in time may be a slot. The disclosure is focused on an occasion when the resource pools are non-successively allocated in time, but it is, of course, possible to allocate the resource pools successively in time.

Referring to 1131 of FIG. 11, startSlot may indicate a start position of a slot in time in the resource pool.

Subframes ($t_0^{SL}, t_1^{SL}, \ldots, t_{T_{max}}^{SL}$), which are time resource belonging to a resource pool for PSSCH in an LTE V2X system may be determined in the following methods:
$0 \leq t_i^{SL} < 10240$,
the subframe index is relative to subframe #0 of the radio frame corresponding to SFN 0 of the serving cell or DFN 0 (described in [11]),
the set includes all the subframes except the following subframes,
subframes in which SLSS resource is configured,
downlink subframes and special subframes if the sidelink transmission occurs in a TDD cell, reserved subframes which are determined by the following steps:
1) the remaining subframes excluding $N_{slss}$ and $N_{dssf}$ subframes from the set of all the subframes are denoted by $(l_0, l_1, \ldots, l_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.
2) a subframe $l_r (0 \leq r < (10240-N_{slss}-N_{dssf}))$ belongs to the reserved subframes if $$r = \left\lfloor \frac{m \cdot (10240 - N_{slss} - N_{dssf})}{N_{reserved}} \right\rfloor \text{ where } m = 0, \ldots, N_{reserved} - 1 \text{ and}$$

$$N_{reserved} = (10240 - N_{slss} - N_{dssf}) \bmod L_{bitmap}.$$

Here, $L_{bitmap}$ the length of the bitmap is configured by higher layers.
the subframes are arranged in increasing order of subframe index.
A bitmap $(b_0, b_1, \ldots, b_{L_{bitmap}-1})$ associated with the resource pool is used where $L_{bitmap}$ the length of the bitmap is configured by higher layers.
A subframe $t_k^{SL} (0 \leq k < (10240-N_{slss}-N_{dssf}-N_{reserved}))$ belongs to the subframe pool if $b_{k'}=1$ where $k'=k \bmod L_{bitmap}$.

For congestion control in a V2X sidelink, the UE may measure a channel busy ratio (CBR). Based on a result of measuring the CBR by the UE, a setting range for transmission parameters may be determined. Determining the transmission parameters based on the CBR is to increase a probability of success in UE's transmission when the UE accesses a channel depending on whether the channel is busy. The CBR measured by the UE may also be reported to the BS. Reporting the CBR to the BS may be restricted to an RRC connected UE. The BS may perform sidelink scheduling and congestion control using the CBR information reported by the UE. A CBR measured by the UE in slot n may be defined as follows:
defined as a ratio of sub-channels with a sidelink received signal strength indicator (S-RSSI) measured by the UE for a PSSCH in slots [n–X and n–1] in the resource pool exceeding a (pre-) configured threshold.
a slot index herein is based on a physical slot index.
X is a parameter to determine a CBR measurement interval, and may be fixed to or (pre-)configured as a particular value such as 100.
the S-RSSI refers to a receive signal intensity, which indicates how much (in [W]) the power received by a receiving UE is and which is observed with valid OFDM symbol positions in a sidelink slot and configured sub-channels.

Whether a corresponding channel is busy may be estimated by a CBR value measured according to a definition of the CBR. A measured CBR value may be quantized and mapped to a CBR level, and based on the CBR level, a setting range of transmission parameters may be determined. The transmission parameters determined by the CBR level may include parameters related to transmission power (max Tx power), a channel occupancy ratio (CR) constraint, a PSSCH modulation and coding scheme (MCS), a PSSCH rank indicator (RI), a PSSCH resource block (RB) allocation range, PSSCH retransmission related information, etc.

When the measured CBR level is high, it means a busy condition in which many UEs are connected to and perform transmission on a corresponding channel, so it may be advantageous in setting a range of transmission parameters in a direction to increase a transmission probability of the transmitting UE. The setting range of transmission parameters corresponding to a CBR level may be (pre-) configured. For example, the setting range of transmission parameters corresponding to the CBR level may be set by a V2X SIB, Uu-RRC, or PC5-RRC. Tables 12 and 13 show examples of Tx parameter sets determined by CBR levels. Referring to Table 8, a method of setting minimum and maximum configuration ranges for parameters related to PSSCH MCS, PSSCH RI, PSSCH RB allocation range, and PSSCH retransmission is shown, and referring to Table 13, a method of setting a range of values that may be set to the maximum for all parameters is shown.

TABLE 12 example 1: Tx parameter set determined by CBR level

| Parameter | Value | |
|---|---|---|
| Max Tx power | max | |
| CR limit | max | |
| PSSCH MCS range | min | max |
| PSSCH RI range | min | max |
| PSSCH RB range | min | max |
| PSSCH retransmission range | min | max |

TABLE 13 example 2: Tx parameter set determined by CBR level

| Parameter | Value |
|---|---|
| Max Tx power | max |
| CR limit | max |
| Max PSSCH MCS | max |
| Max PSSCH RI | max |
| Max PSSCH RB | max |
| Max PSSCH retransmission | max |

Figure 12:
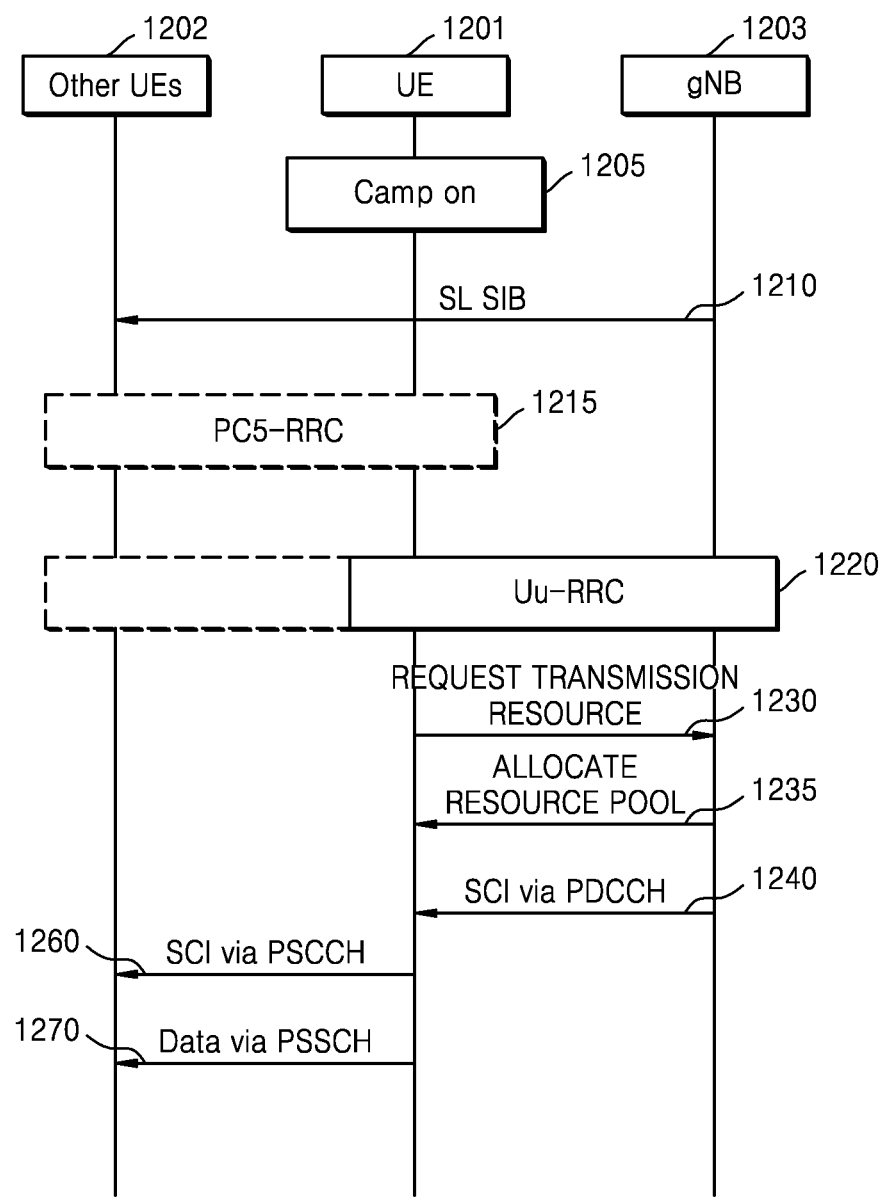
FIG. 12 is a sequence chart for describing a scheduled resource allocation (mode 1) method for sidelink, according to an embodiment of the disclosure.

FIG. 12 is a sequence chart for describing a scheduled resource allocation (mode 1) method for sidelink, according to an embodiment of the disclosure.

The scheduled resource allocation (mode 1) method is a method in which a BS allocates a resource to be used for sidelink transmission to RRC connected UEs in a dedicated scheduling scheme. The scheduled resource allocation (mode 1) method is effective for interference management and resource pool management because the BS is able to manage resources for sidelink.

Referring to FIG. 12, a UE 1201 which is camping on (1205) may receive a sidelink system information bit (SL SIB) (1210) from a BS 1203. The system information may include resource pool information for transmission and reception, configuration information for sensing operation, information for synchronization configuration, information for inter-frequency transmission or reception, etc. Once data traffic is generated for V2X in the UE 1210, the UE may perform RRC connection with the BS (1220). The RRC connection between the UE and the BS may be referred to as Uu-RRC (1220). The Uu-RRC connection may be performed before generation of data traffic for V2X. The UE 1201 may request, from the BS 1203, a transmission resource (1230) that may allow V2X communication with other UEs 1202. In this case, the UE 1201 may use an RRC message or MAC CE to request, from the BS 1203, a transmission resource (1230) that may allow V2X communication. For the RRC message, a SidelinkUEInformation or UEAssistanceInformation message may be used. The MAC CE may be e.g., a buffer status report MAC CE in a new format (including at least an indicator indicating a buffer status report for V2X communication and information about a size of data buffered for D2D communication). A detailed format and content of the buffer status report used in the 3GPP may be seen in the 3GPP standard TS36.321 E-UTRA MAC Protocol Specification. The BS 1203 may allocate V2X transmission resources to the UE 1201 in a dedicated Uu-RRC message. The dedicated Uu-RRC message may be included in an RRCConnectionReconfiguration message. An allocated resource may be a V2X resource or PC5 resource through Uu depending on the type of traffic requested by the UE 1201 or whether the link is busy. For resource allocation determination, the UE may add ProSe per packet priority (PPPP) or logical channel ID (LCID) information of V2X traffic through UEAssistanceInformation or an MAC CE and send the result. The BS 1203 may be able to allocate a remaining resource pool (1235) among resources requested by the UE 1201 because the BS 1203 is also aware of information about resources used by the other UEs 1202. The BS 1203 may indicate final scheduling to the UE 1201 by transmitting DCI in a PDCCH (1240).

In a case of broadcast transmission, the UE 1201 may broadcast sidelink control information (SCI) to the other UEs 1202 in a PSCCH without additional sidelink RRC configuration (1270). Furthermore, it may broadcast data to the other UEs 12-02 in the PSSCH (1270).

On the contrary, for unicast or groupcast transmission, the UE 1201 may perform RRC connection with the other UEs 1202 one to one. To be distinguished from Uu-RRC, RRC connection between UEs may be called PC5-RRC. Even for groupcasting, PC5-RRC 1215 may be individually connected between UEs in the group. Although connection of the PC5-RRC 1215 is shown as an operation subsequent to transmission of SL SIB (1210) in FIG. 12, it may be performed any time before transmission of SL SIB 1210 or transmission of SCI 1260. When the RRC connection between UEs is required, PC5-RRC 1215 connection for sidelink may be performed, and the sidelink control information (SCI) may be transmitted to the other UEs 1202 by unicasting or group casting in a PSCCH (1260). In this case, groupcast transmission of the SCI may be interpreted as group SCI. Furthermore, data may be transmitted to the other UEs 1202 by unicasting or groupcasting in the PSSCH (1270).

Figure 13:
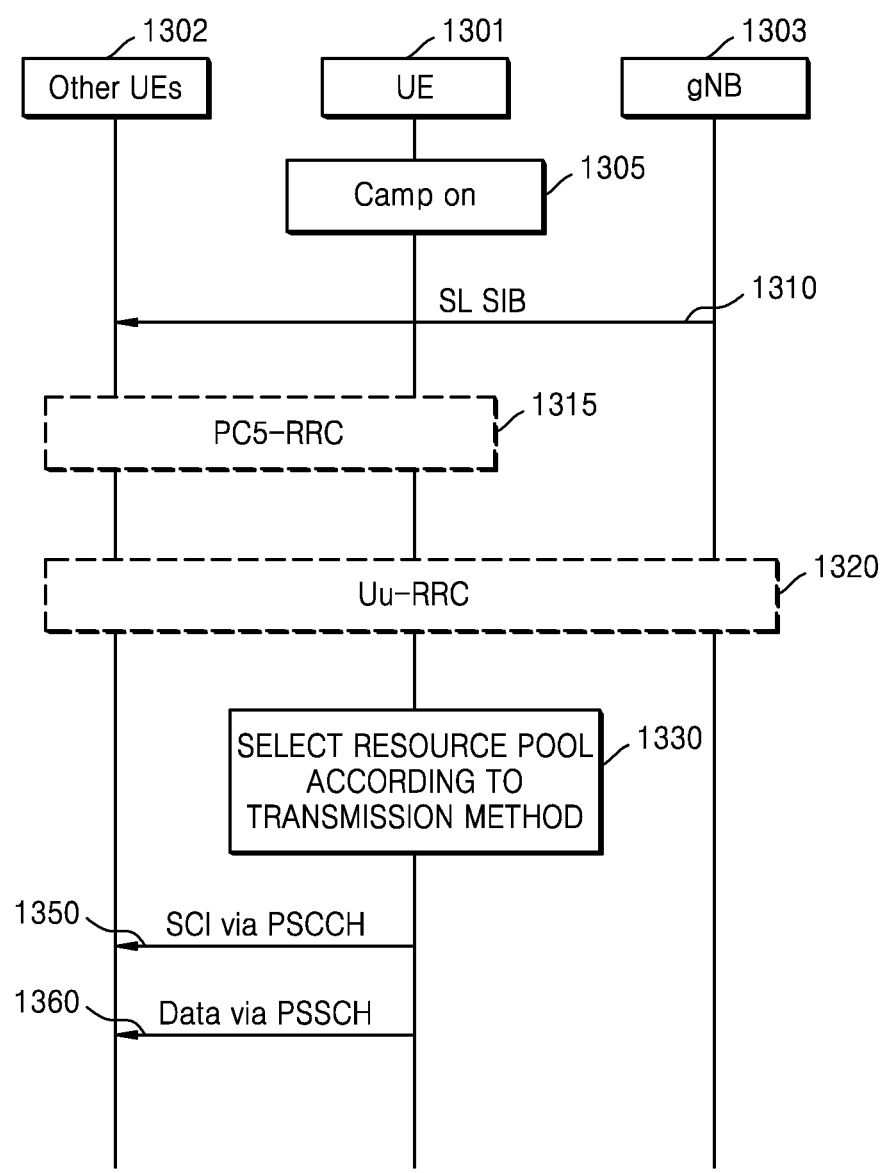
FIG. 13 is a sequence chart for describing a UE autonomous resource allocation (mode 2) method for sidelink, according to an embodiment of the disclosure.

FIG. 13 is a sequence chart for describing a UE autonomous resource allocation (mode 2) method for sidelink, according to an embodiment of the disclosure.

In the UE autonomous resource allocation (mode 2) method, a BS 1302 may provide sidelink transmission or reception resource pools for V2X in system information, and the UE 1301 may select transmission resources according to a set rule. For a resource selection method, there may be zone mapping, sensing based resource selection, random selection, etc. Unlike the scheduled resource allocation (mode 1) method in which the BS 1303 is directly involved in resource allocation, what is shown in FIG. 13 has a difference from the scheduled resource allocation (mode 1) in that the UE 1301 autonomously selects resources based on a resource pool received through the system information in advance to transmit data. In V2X communication, the BS 1303 may allocate various kinds of resource pools (V2V resource pools and V2P resource pools) for the UE 1301.

The resource pools that may be allocated may be comprised of e.g., resource pools allowing the UE to autonomously select available resource pools after sensing resources that are used by other neighboring UEs 1302, and resource pools allowing the UE to randomly select resources from pre-configured resource pools.

The UE 1301 which is camping on (1305) may receive a sidelink system information bit (SL SIB) (1310) from the BS 1303. The system information may include resource pool information for transmission and reception, configuration information for sensing operation, information for synchronization configuration, information for inter-frequency transmission or reception, etc. A difference in operation between FIGS. 12 and 13 is that the BS 1203 and the UE 1201 operate in the RRC connected state in FIG. 12 but operates even in an idle mode 1320 in which RRC connection is not made in FIG. 13. Furthermore, in the idle mode 1320 having no RRC connection, the BS 1303 may not be directly involved in resource allocation but may operate to make the UE 1301 autonomously select transmission resources. Once data traffic for V2X is generated in the UE 1301, the UE 1301 may select a resource pool (1330) in time/frequency domain according to a configured transmission operation from among the resource pools delivered from the BS 1303 through the system information.

Next, in the case of broadcast transmission, the UE 1301 may broadcast sidelink control information (SCI) to the other UEs 1302 in a PSCCH without additional sidelink RRC configuration (1350). Furthermore, the UE 1301 may broadcast data to the other UEs 1302 in the PSSCH (1360).

On the contrary, for unicast or groupcast transmission, the UE 1301 may perform RRC connection with the other UEs 1302 one to one. To be distinguished from Uu-RRC, the RRC connection between UEs may be called PC5-RRC. Even for groupcasting, PC5-RRC may be individually connected between UEs in the group. This may be similar to connection in the RRC layer between the BS and the UE in NR UL and DL, and the connection in the RRC layer for sidelink may be called the PC5-RRC. With the PC5-RRC connection, UE capability information for sidelink may be exchanged or configuration information required for signal transmission or reception may be exchanged. Although connection of the PC5-RRC 1315 is shown as an operation subsequent to transmission of SL SIB (13-10) in FIG. 13, it may be performed any time before transmission of SL SIB 13-10 or transmission of SCI 13-50. When the RRC connection between UEs is required, PC5-RRC connection for sidelink may be performed (1315), and the sidelink control information (SCI) may be transmitted to the other UEs 1302 by unicasting or group casting in a PSCCH (1350). In this case, groupcast transmission of the SCI may be interpreted as group SCI. Furthermore, data may be transmitted to the other UEs 1302 by unicasting and groupcasting in the PSSCH (1360).

In the disclosure, sensing window A and sensing window B are defined to effectively perform sensing in a situation when periodic traffic and non-periodic traffic coexist.

Figure 14A:
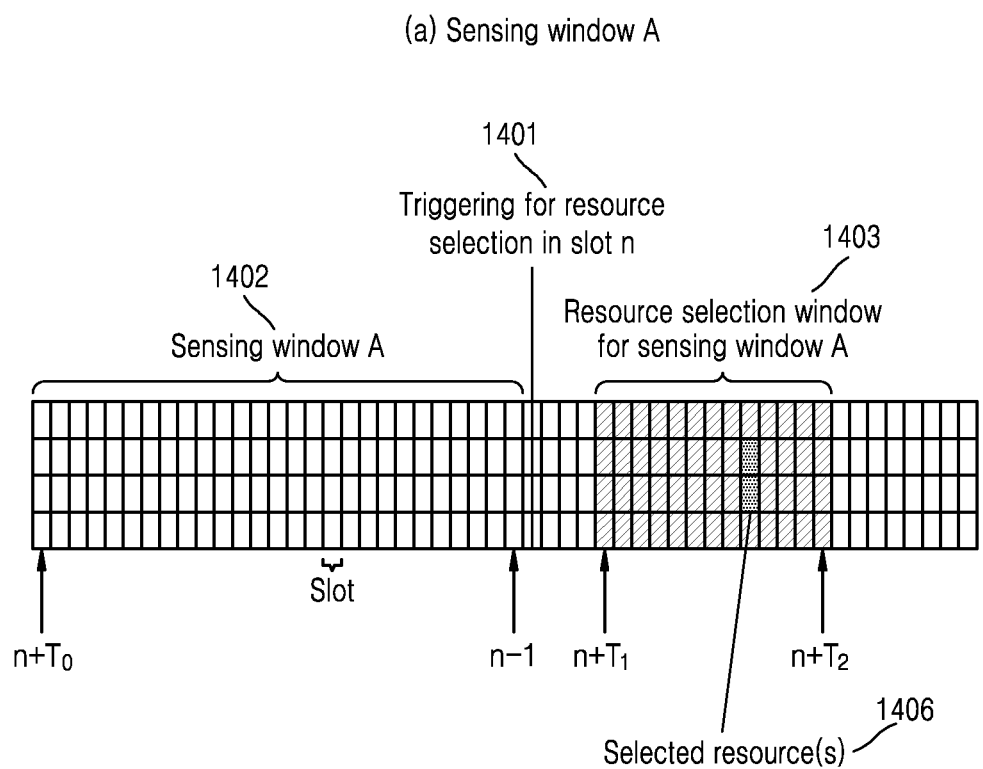
FIG. 14A is a diagram for describing a method of establishing sensing window A in UE autonomous resource allocation (mode 2) for sidelink, according to an embodiment of the disclosure.

FIG. 14A is a diagram for describing a method of establishing sensing window A in UE autonomous resource allocation (mode 2) for sidelink, according to an embodiment of the disclosure.

As shown in FIG. 14A, when triggering for resource selection occurs in slot n (1401), sensing window A 1402 may be defined as follows:

sensing window A 1402 may be defined to have a slot interval $[n-T_0, n-a1]$. $T_0$ may be determined as a fixed value or determined to be configurable.

for example, in the case that $T_0$ is determined as a fixed value, $T_0=1000*2^\mu$ for periodic traffic. On the other had, for non-periodic traffic, a fixed value may be set such that $T_0=100*2^\mu$. The fixed value of $T_0$ may be changed to a different value based on a traffic property considered, or may be fixed to the same value for periodic and non-periodic traffic. Here, $\mu$ is an index corresponding to a numerology, and may be set to the following value depending on subcarrier spacing (SCS).

SCS=15 kHz, $\mu=0$
SCS=30 kHz, $\mu=1$
SCS=60 kHz, $\mu=2$
SCS=120 kHz, $\mu=3$ in the case that the $T_0$ is determined to be configurable, the configuration may be indicated in a sidelink system information bit (SL SIB) or by UE-specific higher layer signaling. In the case of being indicated in the SL SIB, the corresponding value may be set in resource pool information of the corresponding system information. When $T_0$ is set in the resource pool information, always constant $T_0$ may be used in the resource pools.

SCI decoding and sidelink measurement for another UE may be performed in the sensing window A 1402.

resource allocation information for the other UE and QoS information of packets may be obtained from the SCI received in the sensing window A 1402. The resource allocation information may include a reservation interval for a resource. The QoS information may include priority information depending on latency, reliability, a minimum required communication range for transmitted traffic, data rate requirements, etc. Furthermore, location information of the other UE may be obtained from the received SCI. A TX-RX distance may be calculated based on the location information of the other UE and my location information.

sidelink reference signal received power (SL RSRP) may be measured from the SCI received in the sensing window A 1402.

sidelink received signal strength indication (SL RSSI) may be measured from the SCI received in the sensing window A 1402.

The sensing window A 1402 may be used for a main purpose of determining resources for UE autonomous resource allocation (mode 2) by sensing periodic traffic. The UE may grasp periodic resource allocation information for the other UE through SCI decoding, and when allocation of transmission resource to a resource to be used by the other UE is not effective based on a sidelink measurement result such as the SL RSRP or SL RSSI, may exclude the resource from the resource selection window 1403. As shown in FIG. 14A, when triggering for resource selection occurs in slot n (1401), a resource selection window 1403 may be defined as follows:

resource selection window 1403 may be defined to have a slot interval $[n+T_1, n+T_2]$. $T_1$ and $T_2$ may be determined as fixed values or determined to be configurable. On the other hand, $T_1$ and $T_2$ may be determined to be in a fixed range, and the UE may set suitable values from the fixed range taking into account the implementation.

as an example in which $T_1$ and $T_2$ are determined to be in a fixed range and the UE sets suitable values from the fixed range taking into account the implementation, the UE may set them in the range of $T_1 \leq 4$ and $20 \leq T_2 \leq 100$ for the UE implementation.

based on a result of the sensing performed in the sensing window A 1402, a final transmission resource 1406 may be selected in the resource selection window 1403.

When only the sensing window A 1402 is used to perform sensing as shown in FIG. 14A to perform transmission resource selection, the following transmission resource selection methods may be used:

transmission resource selection method-1
step-1: the number $M_{total}$ of resource candidates available for resource allocation based on resource pool information in the resource selection window 1403 may be determined. Details of this may be seen in embodiment 1.

step-2: Resources determined to be ineffective for use because the other UE occupies the resources may be excluded in the resource selection window 1403 based on the result of sensing in the sensing window A 1402, and there may be $X(\leq M_{total})$ resource candidates left among the resource candidates available for resource allocation. A method of excluding resources through SCI decoding and sidelink measurement for the other UE may be used.

step-3: A resource candidate list X may be reported to a UE higher layer, and a final transmission resource may be randomly selected (1406) from among X candidates in the UE higher layer.

Figure 14B:
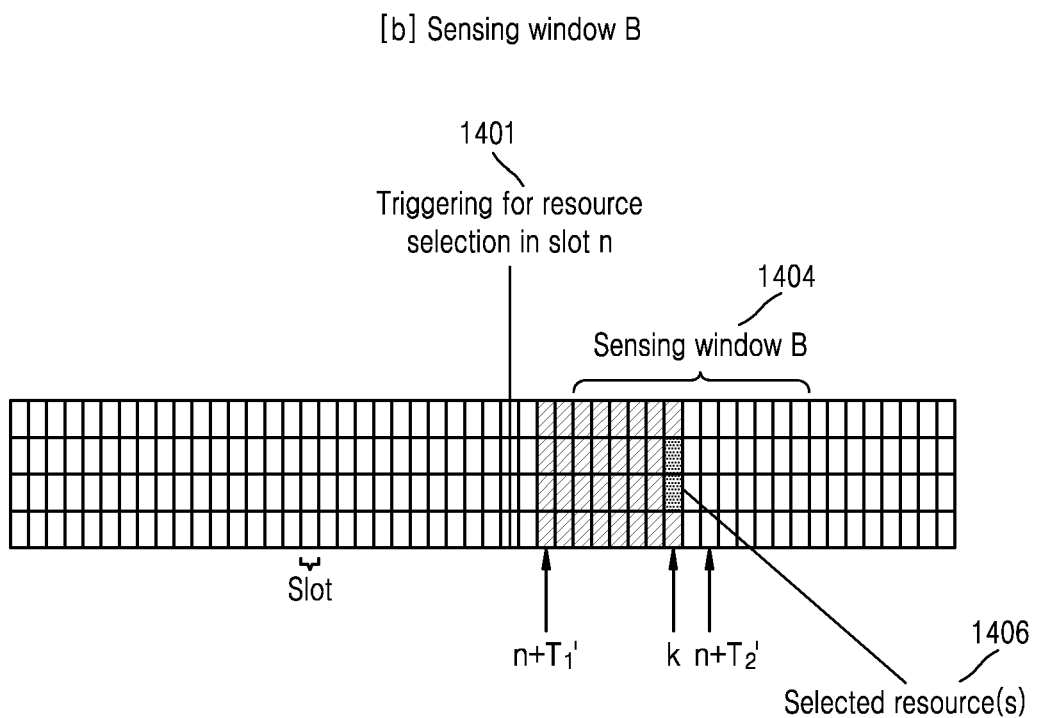
FIG. 14B is a diagram for describing a method of establishing sensing window B in UE autonomous resource allocation (mode 2) for sidelink, according to an embodiment of the disclosure.

FIG. 14B is a diagram for describing a method of establishing sensing window B in UE autonomous resource allocation (mode 2) for sidelink, according to an embodiment of the disclosure.

As shown in FIG. 14B, when triggering for resource selection occurs in slot n (1401), sensing window B 1404 may be defined as follows:

sensing window B 1404 may be defined to have a slot interval $[n+T_1', n+T_2']$. $T_1'$ and $T_2'$ may be determined as fixed values or determined to be configurable. On the other hand, $T_1'$ and $T_2'$ may be determined to be in a fixed range, and the UE may set suitable values from the fixed range taking into account the implementation. Assuming that k indicates a slot in which a resource is finally selected, the sensing window B 1404 may end in slot k, in which case the sensing window 1404 may have a range of $[n+T_1', k]$.

$T_1'$ and $T_2'$ may be set to have the same values as or different from the values of $T_1$ and $T_2$ of the resource selection window 1403, respectively.

for example, in a case of $T_1'=0$, it means that sensing is performed from the triggering slot n in which to select a transmission resource.

with the set values of $T_1'$ and $T_2'$, the sensing window B 1404 may be established in one or more slots.

SCI decoding and sidelink measurement for another UE may be performed in the sensing window B 1404.

details of sensing operations in the sensing window B 1404 may be seen in embodiments 2 and 3.

The sensing window B 1404 may be used for a purpose of determining resources for UE autonomous resource allocation (mode 2) by sensing periodic and non-periodic traffic, in addition to the sensing window A. In the sensing window B 1404 established based on and after the triggering slot n in which to select transmission resources, it is possible to sense non-periodic traffic that may not be predicted in the sensing window A, by using sidelink measurement for a slot allocated an actual transmission resource. Performing the sensing in the sensing window B 1404 may be understood as an operation of sensing traffic that is sensed in every slot no matter whether the traffic is periodic or non-periodic. When the sensing window B 1404 is used to perform sensing as shown in FIG. 14B to perform transmission resource selection, the following transmission resource selection method may be used:

transmission resource selection method-2
- step-1: sensing is performed in a corresponding slot in the sensing window B 1404 to determine whether the corresponding resource is idle.
    - a resource allocation granularity in frequencies may be defined to be A ($\geq 1$) sub-channels or all the sub-channels. Depending on the resource allocation granularity in frequencies, the number $N_{total}$ of resource candidates available for resource allocation in the slot may be determined.
    - sensing may be performed by SCI decoding and sidelink measurement.
- step-2-1: when the corresponding resource is determined to be idle from the sensing of step-1, the final transmission resource 1406 may be determined among a number $N_{total}$ of resource candidates available for resource allocation in the slot.
- step-2-2: when it is determined from the sensing of step-1 that the corresponding resources are all busy, the following operation may be selected:
    - when the next slot is also established to be the sensing window B 1404, step-1 may be performed in a slot after the next slot.
    - when the next slot is not established to be the sensing window B 1404, the following operation may be considered:
        - the final transmission resource 1406 may be determined using QoS information or an energy detection result in the current slot. The QoS information may include priority information based on latency, reliability, proximity service (ProSe) per-packet priority (PPPP), ProSe per-packet reliability (PPPR), a minimum required communication range for traffic transmitted, data rate requirements, etc. Priority may be information including PPPP and PPPR and may have a value selected in a range within certain values, and data that is required to be transmitted in a sidelink may have a priority value.
        - transmission in the current slot may be canceled and a backoff operation may be performed.

As defined in FIGS. 14A and 14B, the sensing window A and the sensing window B may be distinguished based on a point in time when the triggering for transmission resource selection occurs. Specifically, sensing areas established before and after the triggering slot n for transmission resource selection may be defined as the sensing window A and the sensing window B, respectively.

Figure 14C:
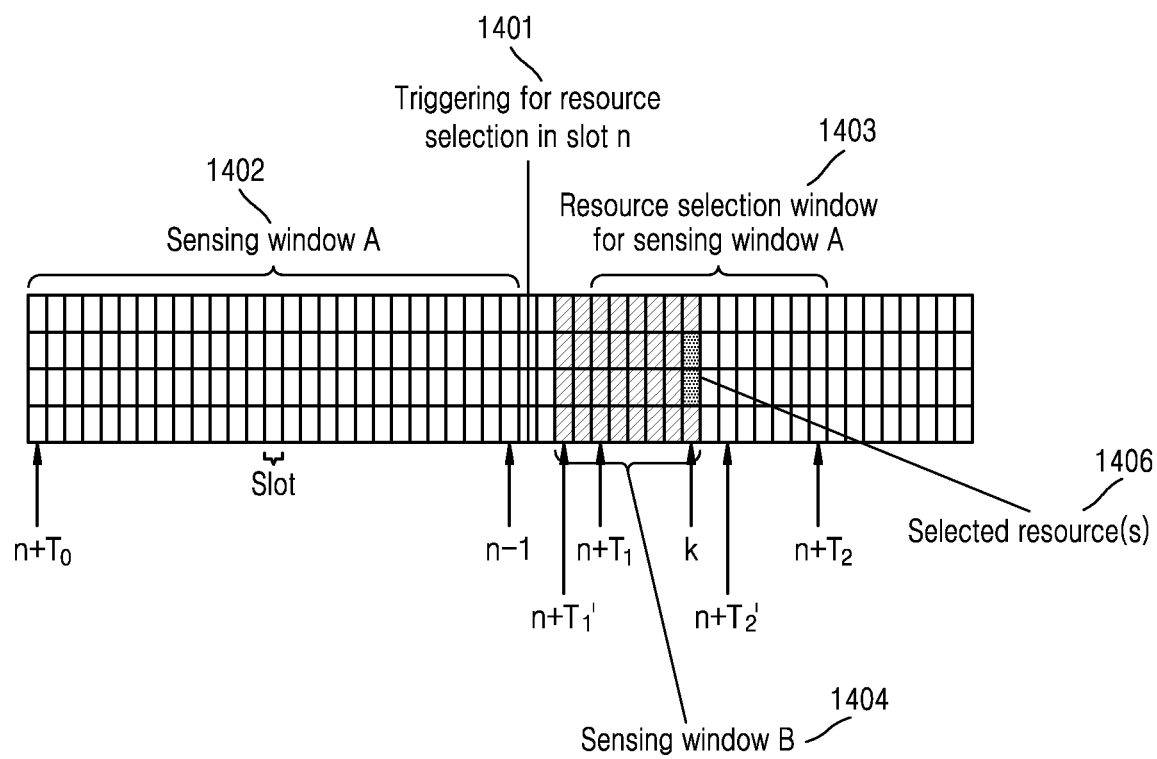
FIG. 14C is a diagram for describing a method of establishing sensing window A and sensing window B in UE autonomous resource allocation (mode 2) for sidelink, according to an embodiment of the disclosure.

FIG. 14C is a diagram for describing a method of establishing sensing window A and sensing window B in UE autonomous resource allocation (mode 2) for sidelink, according to an embodiment of the disclosure.

When triggering for transmission resource selection occurs in slot n (1401), the sensing window A 1402 and the sensing window B 1404 may be defined as described above. When the sensing window A 1402 and the sensing window B 1404 are both used to perform sensing as shown in FIG. 14C to perform transmission resource selection, the following transmission resource selection method may be used:

transmission resource selection method-3
- step-1: the number $M_{total}$ of resource candidates available for resource allocation based on resource pool information in the resource selection window 1403 may be determined.
- step-2: Resources determined to be ineffective for use because the other UE occupies the resources may be excluded in the resource selection window 1403 based on the result of sensing in the sensing window A 1402, and there may be $X(\leq M_{total})$ resource candidates left among the resource candidates available for resource allocation. SCI decoding and sidelink measurement for the other UE may be used in a method of excluding resources.
- step-3: A resource candidate list X may be reported to a UE higher layer, and Y candidates may be randomly down-selected from among X candidates in the UE higher layer.
- step-4-1: When the sensing window B 1404 is included in the resource selection window 1403, the UE may select the final transmission resource 1406 according to the transmission resource selection method-2 based on a sensing result of the sensing window B 1404 in the physical layer, from among the Y candidates determined in the higher layer.
    - when the sensing window B 1404 is included in the resource selection window 1403, it corresponds to an interval [n+$T_1$, k] in FIG. 14C. This condition may be determined by setting $T_1$ and $T_2$, and $T_1'$ and $T_2'$.
- step-4-2: When the sensing window B 1404 is not included in the resource selection window 1403, the final transmission resource 1406 may be selected according to the transmission resource selection method-2 based on a sensing result of the sensing window B 1404 in the physical layer.
    - when the sensing window B 1404 is not included in the resource selection window 1403, it corresponds to an interval [n+$T_1'$, n+$T_1$−1] in FIG. 14C. This condition may be determined by setting $T_1$ and $T_2$, and $T_1'$ and $T_2'$.

In the transmission resource selection method-3, selecting Y candidates in the higher layer (in step-3) may be omitted and the following method may be used:

transmission resource selection method-4
- step-1: the number $M_{total}$ of resource candidates available for resource allocation based on resource pool information in the resource selection window 1403 may be determined.
- step-2: Resources determined to be ineffective for use because the other UE occupies the resources may be excluded in the resource selection window 1403 based on the result of sensing in the sensing window A 1402, and there may be $X(\leq M_{total})$ resource candidates left among the resource candidates available for resource allocation. A method of excluding resources through SCI decoding and sidelink measurement for the other UE may be used.
- step-3-1: When the sensing window B 1404 is included in the resource selection window 1403, the UE may select the final transmission resource 1406 according to the transmission resource selection method-2 based on a sensing result of the sensing window B 1404 in the physical layer, from among the X candidates.

when the sensing window B 1404 is included in the resource selection window 1403, it corresponds to an interval [n+T$_1$, k] in FIG. 14C. This condition may be determined by setting T$_1$ and T$_2$, and T$_1$' and T$_2$'.

step-3-2: When the sensing window B 1404 is not included in the resource selection window 1403, the final transmission resource 1406 may be selected according to the transmission resource selection method-2 based on a sensing result of the sensing window B 1404 in the physical layer.

when the sensing window B 1404 is not included in the resource selection window 1403, it corresponds to an interval [n+T$_1$', n+T$_1$−1] in FIG. 14C. This condition may be determined by setting T$_1$ and T$_2$, and T$_1$' and T$_2$'.

When the sensing window A 1402 and the sensing window B 1404 are established at the same time, the final resource selection may be determined by the resource selection window 1403 and the sensing window B 1404. The proposed transmission resource selection method-3 or transmission resource selection method-4 is a method that optimizes transmission resource selection by establishing the sensing window A 1402 and the sensing window B 1404 at the same time and performing sensing while periodic traffic and non-periodic traffic coexist.

In the aforementioned UE autonomous resource allocation (mode 2) method for sidelink, operations of sensing and selecting transmission resources may be performed in various manners. For example, when the sensing window A and the sensing window B are established at the same time, the UE may be implemented to select a final transmission resource by performing sensing for the sensing window B when triggering for transmission resource selection occurs in slot n while keeping performing sensing for the sensing window A. However, the operation of the UE keeping performing sensing for the sensing window A has an advantage in terms of latency in transmission resource selection because the sensing result of the sensing window A may be used right away at any time, but may have a disadvantage in terms of energy consumption of the UE. Hence, alternatively, the UE may be implemented to select a final transmission resource by performing sensing for the sensing window A immediately when traffic to be transmitted occurs and performing sensing for the sensing window B after triggering for transmission resource selection occurs in slot n. The latter may have an advantage of minimizing energy consumption of the UE by performing sensing only as required, but may have weakness in terms of latency in transmission resource selection.

A method of discovering an empty frequency-time resource and transmitting a signal in the discovered frequency-time resource for sidelink communication between UEs was described, but the disclosure is not limited thereto and may apply various channel occupancy and channel reservation methods.

Figure 15A:
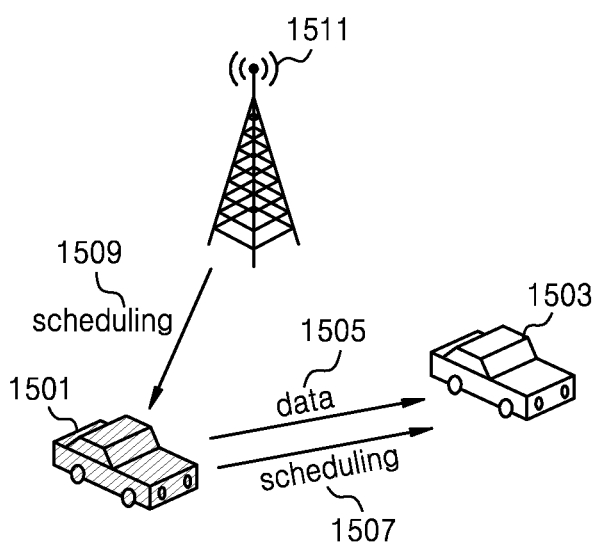
FIG. 15A is a diagram for describing a mode 1 method, which is a method of performing sidelink data transmission after receiving scheduling information from a base station (BS), according to an embodiment of the disclosure.

FIG. 15A is a diagram for describing a mode 1 method, which is a method of performing sidelink data transmission after receiving scheduling information from a BS, according to an embodiment of the disclosure.

Specifically, FIG. 15 is a diagram for describing a mode 1 method, which is a method of performing sidelink data transmission after receiving scheduling information from a BS as shown in FIG. 12. In the disclosure, a method in which the UE receives scheduling information from the BS and performs sidelink communication based on the scheduling information will now be referred to as mode 1. A UE 1501 which intends to perform sidelink transmission may receive scheduling information (1509) for sidelink communication from a BS 1511. In the disclosure, the UE 1501 intending to perform data transmission in a sidelink may be called a transmitting UE, and a UE 1503 performing data reception in a sidelink may be called a receiving UE. The transmitting UE 1501 and the receiving UE 1503 may, however, each perform both data transmission and reception in sidelinks. The scheduling information (1509) for sidelink communication may be obtained by receiving downlink control information (DCI), which may include the following information:

carrier indicator: used to schedule a sidelink of another carrier in a situation when carrier aggregation (CA) is applied.

lowest index of sub-channel allocation for initial transmission: used for frequency resource allocation for initial transmission.

information to be included in sidelink control information frequency resource allocation information. Resource allocation or resource reservation information for initial transmission, retransmission, and subsequent N-th transmission may be included.

time gap information between transmission and retransmission information about a sidelink slot structure. Information about which slot and which symbols may be used for sidelink may be included.

HARQ-ACK/CSI feedback timing information. Timing information for transmitting HARQ-ACK or CSI feedback to the BS in the sidelink may be included.

receiver ID: ID information about receiving UEs quality of service (QOS) information such as priority: information about which priority of data will be transmitted Scheduling may be used for single sidelink transmission, or may be used for periodic transmission, semi-persistent scheduling (SPS) or configured grant transmission. A scheduling method may be identified with an indicator included in the DCI, an RNTI by which to scramble CRC, or an ID value. Bit(s) 0(s) may be added to the DCI to make it have the same size as another DCI format for DL scheduling or UL scheduling.

Quality of service (QOS) may be used as an index to secure V2X sidelink services. Specifically, in the case of scheduled resource allocation (mode 1) method, the BS may directly perform scheduling for sidelink communication by reflecting the QoS information, and in the case of UE autonomous resource allocation (mode 2) method, the QoS may be reflected in a process performed by the UE to perform sensing for resource allocation. In LTE V2X, QoS may be defined according to ProSe per-packet priority (PPPP), PPPP values corresponding to 8 priority levels may be defined and the corresponding values may be indicated by sidelink control information (SCI). In a case of NR V2X, not only broadcasting but also unicast and groupcast communications are considered between UEs, so the QoS may be considered more importantly. Especially, to support advanced service scenarios such as group driving, advanced driving, sensor expansion, remote driving, etc., considered in the NR V2X, QoS requirements need to be defined more variously and more specifically as compared to LTE V2X. Hence, in the NR V2X, PC5 5G QoS indicators (PQIs) for various QoS requirements are defined, and the PQI may include a default priority level, a packet delay budget, a packet error rate, a default maximum date burst volume, and a default averaging window. Accordingly, even in the NR V2X, in the case of scheduled resource allocation (mode 1) method, the BS may perform scheduling for sidelink communication by reflecting a PQI index, and in the case of UE autonomous resource allocation (mode 2) method, one or more of PQI indexes may be reflected in a process performed by the UE to perform sensing for resource allocation. Specifically, the default priority level may be defined to have 8 priority levels, similar to PPPPs of the LTE V2X. Furthermore, the packet delay budget may be reflected in establishing a sensing window of mode 2. Moreover, the packet error rate may be set to various values between 10^-1 to 10^-5, which may be used in configuring transmission parameters and sidelink feedback.

On receiving DCI for sidelink scheduling from the BS 1511, the transmitting UE 1501 may transmit a PSCCH including sidelink scheduling information (1507) and transmit the corresponding data, a PSSCH (1505). The sidelink scheduling information (1507) may be sidelink control information (SCI), which may include the following information:

HARQ process number: an HARQ process ID for HARQ related operation of data for transmission new data indicator (NDI): information about whether data currently transmitted is new data redundancy version: information about which parity bit is sent when data goes through channel coding and mapping Layer-1 source ID: ID information of a transmitting UE in the physical layer Layer-1 destination ID: ID information of a receiving UE in the physical layer frequency-domain resource assignment for scheduling PSSCH: frequency domain resource configuration information of data for transmission MCS: modulation order and coding rate information QoS indication: includes a priority, target latency/delay, a target range, a target error rate, etc.

antenna port(s): antenna port information for data transmission

DMRS sequence initialization: include information about an ID value for initialization of a DMRS sequence PTRS-DMRS association: include information about phase tracking reference signal (PTRS) mapping.

CBGTI: used as an indicator for CBG based retransmission.

resource reservation: information for resource reservation time gap between initial transmission and retransmission: information about a time gap between initial transmission and retransmission retransmission index: indicator to identify retransmission transmission format/cast type indicator: indicator for identification between transmission formats or between unicast/groupcast/broadcast zone ID: position information of a transmitting UE NACK distance: reference indicator to determine whether the receiving UE needs to transmit HARQ-ACK/NACK HARQ feedback indication: includes whether the HARQ feedback is to be transmitted or is being transmitted.

time-domain resource assignment for scheduling PSSCH: Time domain resource information of sidelink data for transmission second SCI indication: indicator including mapping information of a second SCI for second stage control information DMRS pattern: information about DMRS pattern (e.g., a symbol position to which the DMRS is mapped)

The control information may be included in single SCI and transmitted to the receiving UE, or may be included in two pieces of SCI and transmitted. Being transmitted in two pieces of SCI may be called a 2-stage SCI method.

Figure 15B:
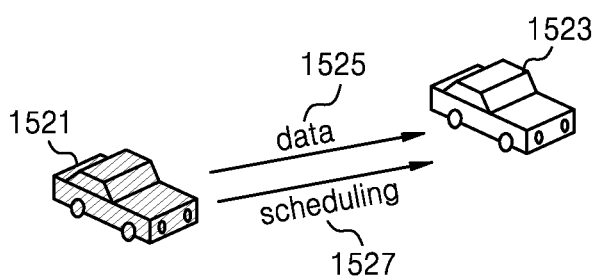
FIG. 15B is a diagram for describing a mode 2 method, which is a method of performing sidelink data transmission without receiving scheduling information from a BS, according to an embodiment of the disclosure.

FIG. 15B is a diagram for describing a mode 2 method, which is a method of performing sidelink data transmission without receiving scheduling information from a BS, according to an embodiment of the disclosure.

In the disclosure, a method in which a transmitting UE 1521 determines and performs sidelink communication without receiving scheduling information from the BS is referred to as mode 2. The transmitting UE 1521 may transmit a PSCCH including sidelink scheduling information (1527) to a receiving UE 1523, and transmit corresponding data (1525), which is a PSSCH, to the receiving UE 1523. The sidelink scheduling information (1527) may include SCI, and the SCI may include information identical or similar to the SCI information in the mode 1.

In the disclosure, downlink (DL) may refer to a link in which a signal is transmitted from the BS to the UE. In the disclosure, uplink (UL) may refer to a link for transmission from the UE to the BS.

Figure 16A:
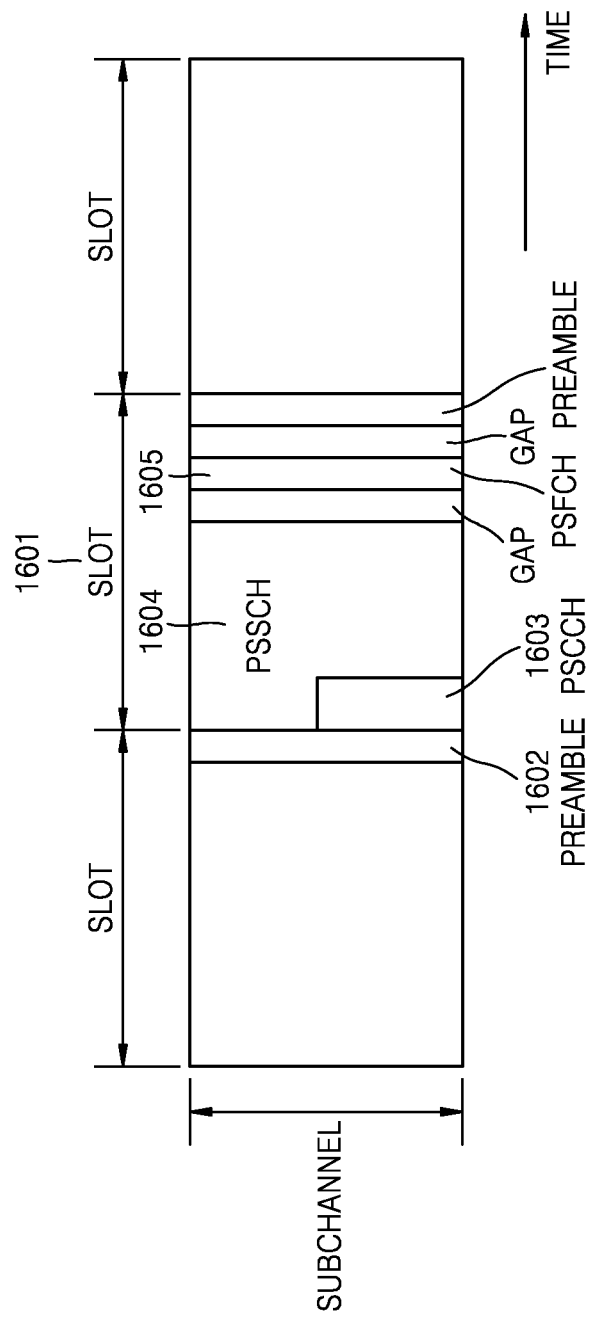
FIG. 16A illustrates a mapping structure of physical channels mapped to a slot for sidelink, according to an embodiment of the disclosure.

FIG. 16A illustrates a mapping structure of physical channels mapped to a slot for sidelink, according to an embodiment of the disclosure.

A transmitting UE may transmit a preamble signal in one or more symbols before transmitting a corresponding slot (1601). The preamble signal may be used to correctly perform automatic gain control (AGC) for controlling strength of amplification when the receiving UE amplifies power of a received signal. Furthermore, transmission of the preamble may be determined according to whether a slot before the slot (1601) is transmitted. Specifically, preamble transmission may be omitted when the transmitting UE transmits a signal to the same receiving UE in a slot before the slot (1601). A PSCCH (1603) including control information of early symbols in the slot 1601 may be transmitted, and a PSSCH (1604) scheduled in the control information of the PSCCH (1603) may be transmitted in the early symbols or subsequent symbols of the slot (1601). A portion of sidelink control information may be mapped to and transmitted in the PSSCH (1604). Furthermore, referring to FIG. 16A, a physical channel for transmitting feedback information, a physical sidelink feedback channel (PSFCH) (1605), may be located in an ending portion of the slot. A certain empty time may be secured between the PSSCH (1604) and the PSFCH (1605) for a UE that has transmitted or received the PSSCH (1604) to prepare to transmit or receive the PSFCH (1605). After transmission or reception of the PSFCH (1605), a section that has been empty for a certain period of time may be obtained.

The UE may be pre-configured with the position of a slot that may transmit the PSFCH (1605). Being configured with the position of a slot may be predetermined in the process of manufacturing the UE, delivered when the UE accesses a sidelink related system, delivered from a BS when connected to the BS, or delivered from another UE.

Figure 16B:
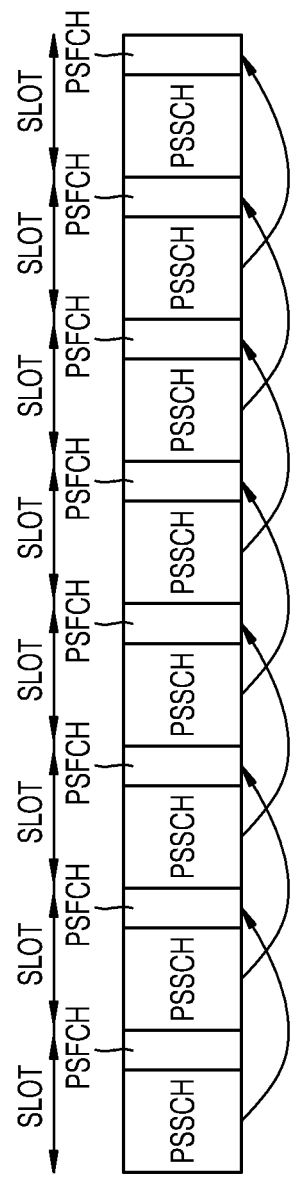
FIG. 16B illustrates resources configured to transmit or receive a physical sidelink feedback channel (PSFCH) in every slot, according to an embodiment of the disclosure.

FIG. 16B illustrates resources configured to transmit or receive a physical sidelink feedback channel (PSFCH) in every slot, according to an embodiment of the disclosure.

For example, when a period of a resource in which to transmit or receive a PSFCH may be set with a parameter such as periodicity_PSFCH_resource, FIG. 16 may correspond to an occasion of periodicity_PSFCH_resource=1 slot. Furthermore, the period may be set in the unit of a millisecond (msec), and a resource for transmitting a PSFCH may be configured in every slot depending on subcarrier spacing (SCS). Referring to FIG. 16B, feedback information for the PSSCH scheduled in slot n may be transmitted on a PSFCH in slot n+1.

Figure 16C:
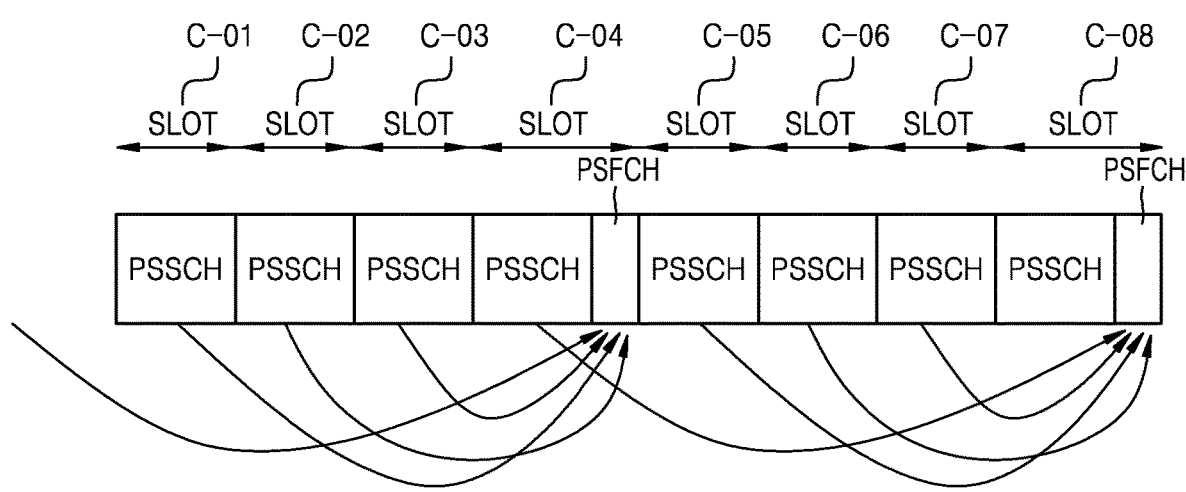
FIG. 16C illustrates resources configured to transmit or receive a PSFCH in every four slots, according to an embodiment of the disclosure.

FIG. 16C illustrates resources configured to transmit or receive a PSFCH in every four slots, according to an embodiment of the disclosure.

Referring to FIG. 16C, a resource may be configured to transmit or receive a PSFCH in every four slots. Of four slots c-01, c-02, c-03, and c-04, only the last slot c-04 may be configured to transmit or receive a PSFCH. Similarly, of four slots c-05, c-06, c-07, and c-08, only the last slot c-08 may be configured to transmit or receive a PSFCH. An index of a slot may be determined in a resource pool. Specifically, the four slots c-01, c-02, c-03, and c-04 are not actually physically successive slots, but may be slots that appear successively among slots belonging to a resource pool (or slot pool) used by the transmitter and receiver. Arrows in FIG. 16C may indicate slots for a PSFCH in which HARQ-ACK feedback information for a PSSCH is transmitted. For example, the HARQ-ACK information for the PSSCH transmitted (or scheduled) in slots c-01, c-02, and c-03 may be included in the PSFCH that may be transmitted in the slot c-04 to be transmitted or received. Similarly, the HARQ-ACK information for the PSSCH transmitted (or scheduled) in slots c-04, c-05, c-06, and c-07 may be included in the PSFCH that may be transmitted in the slot c-08 to be transmitted or received. The reason that the HARQ-ACK feedback information for the PSSCH transmitted in the slot c-04 is not transmitted in the same slot c-04 is because a time is insufficient for the UE to complete decoding of the PSSCH transmitted in the slot c-04 and then transmit the PSFCH in the same slot c-04. That is, a minimum processing time required to process the PSSCH and prepare for the PSFCH may not be sufficiently short.

Transmission or reception may be correctly performed when the UE is aware of the number of bits of HARQ-ACK feedback included in the PSFCH when transmitting or receiving the PSFCH. The number of bits of HARQ-ACK feedback included in the PSFCH and for which PSSCH the HARQ-ACK bits are to be included may be determined based on one or more combinations of the following parameters:

a period of a slot in which to transmit or receive the PSFCH according to a parameter such as periodicity_PSFCH_resource whether to bundle HARQ-ACK It may be a value determined by an AND operation of HARQ-ACK bits for a PSFCH transmitted in a certain number of slots before PSFCH transmission or reception. (That is, when any one is NACK, it is determined to be NACK).

the number of transmission blocks (TBs) included in the PSSCH whether to use and configure code block group (CBG) based retransmission whether to activate HARQ-ACK feedback the number of PSSCHs actually transmitted or received minimum processing time (K) for the UE to prepare for PSSCH processing and PSFCH transmission When the UE receives a PSSCH in slot n and a resource for transmitting a PSFCH in slot n+x is configured or given, the UE may use the smallest x of integers equal to or greater than K to map information of the HARQ-ACK feedback for the PSSCH to the PSFCH in slot n+x and transmit the HARQ-ACK feedback. K is a value preset by the transmitting UE or a value set in a resource pool in which the PSSCH or PSFCH is transmitted, and each UE may exchange its capability with the transmitting UE in advance to set K.

The disclosure provides a method and apparatus for determining a resource and timing to transmit a signal in a sidelink. Furthermore, a method and apparatus for mapping data to a PSSCH in a sidelink is provided.

First Embodiment

In the first embodiment, provided is a method and apparatus for determining sidelink transmission timing to perform sidelink transmission or reception after receiving scheduling information from a BS. The first embodiment may be applied to a case of performing LTE sidelink transmission after being scheduled from an LTE BS (eNB), a case of performing NR sidelink transmission after being scheduled from an LTE BS (eNB), a case of performing LTE sidelink transmission after being scheduled from an NR BS (gNB), a case of performing NR sidelink transmission after being scheduled from an NR BS (gNB), or other cases, without being limited thereto.

Figure 17:
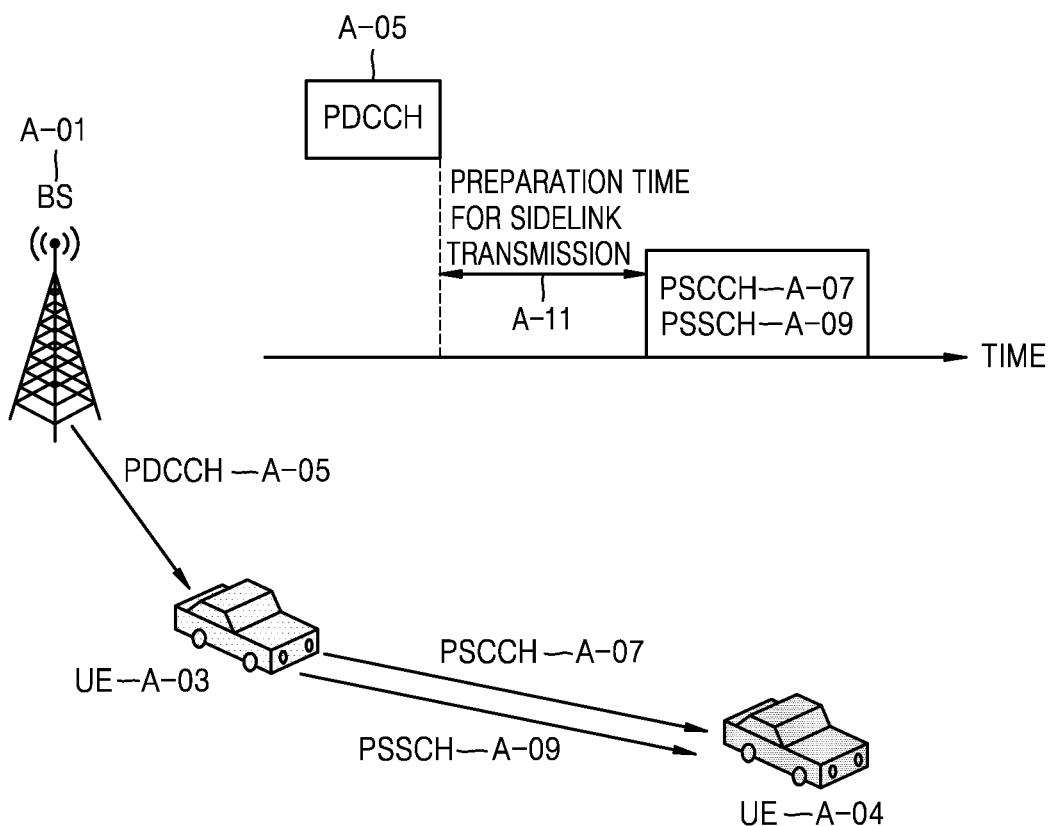
FIG. 17 is a diagram for describing a time to transmit a sidelink signal after receiving scheduling information from a BS, according to an embodiment of the disclosure.

FIG. 17 is a diagram for describing a time to transmit a sidelink signal after receiving scheduling information from a BS, according to an embodiment of the disclosure.

A BS (A-01) may deliver scheduling information for sidelink data transmission by transmitting configuration information and DCI to a UE (A-03). In this case, the BS (A-01) delivers the DCI in a PDCCH (A-05), and the UE may understand scheduling DCI information by decoding the PDCCH (A-05). The UE (A-03) may grasp a resource for sidelink transmission from the scheduling DCI information, and accordingly, transmit a PSCCH (A-07) and a PSSCH (A-09), which are a control signal and a data signal, to another UE (A-04) or a plurality of other UEs in sidelinks. The UE (A-03) requires a preparation time having a certain period or more until transmitting the PSCCH (A-07) and the PSSCH (A-09) after receiving the PDCCH (A-05). The preparation time may include a time to decode the received PDCCH (A-05), a time to prepare control information and data for transmission according to the DCI scheduling information, and a time required to map the prepared control information and data to and transmit them in the PSCCH (A-07) and the PSSCH (A-09), respectively. Considering a sidelink transmission preparation time (A-11), the PSCCH (A-07) and the PSSCH (A-09) may be transmitted after the following time.

$$T_{DL} - T^{TA} + T_{proc} \qquad [\text{Equation A}]$$

$T_{DL}$ is a time when the scheduling PDCCH (A-05) is transmitted in a DL, and may indicate the last portion in the last symbol of the PDCCH (A-05). $T^{TA}$ may be a value calculated based on application of timing advance (TA). $T^{TA}$ may be determined as a time or half of the time to perform TA, but the first embodiment may not be limited thereto. $T_{proc}$ may be a minimum time required until the UE (A-03) transmits the PSCCH (A-07) and the PSSCH (A-09) after receiving the PDCCH (A-05), and may be set to 4 msec in the case of performing LTE sidelink transmission after being scheduled from the LTE BS (eNB). It may also be set to 4 msec in the case of performing NR sidelink transmission after being scheduled from the LTE BS (eNB). It may be set to 3 msec in the case of performing LTE sidelink transmission after being scheduled from the NR BS (gNB). It may be set to 2 msec in the case of performing NR sidelink transmission after being scheduled from the NR BS (gNB). The aforementioned times are examples and are not limited thereto. In the case of performing LTE or NR sidelink transmission after being scheduled from the NR BS (gNB), $T_{proc}$ may be given in symbols, for example, as follows, depending on subcarrier spacing of the PDCCH (A-05) received from the gNB: In the following description, µ may be given as µ=0, µ=1, µ=2, and µ=3 for SCS 15 KHz, 30 kHz, 60 kHz, and 120 KHz, respectively.

TABLE A

| µ | $T_{proc}$ (Symbol) |
|---|---|
| 0 | 8 |
| 1 | 10 |
| 2 | 17 |
| 3 | 20 |

In another example, a different value of $T_{proc}$ may be applied depending on UE capability. The UE may basically set $T_{proc}$ on the assumption of the values set in Table A, but may apply values give in the following Table B when the UE has reported its much faster processing capability to the BS.

TABLE B

| µ | $T_{proc}$ (Symbol) |
|---|---|
| 0 | 3 |
| 1 | 4.5 |
| 2 | 9 |
| 3 | 11 |

For this, the UE may deliver UE capability information about its processing capability to the BS via higher layer signaling. Accordingly, resources before the point in time calculated in Equation A may be excluded in the resource selection procedure so that the UE (A-03) may not select the resources when selecting resources for sidelink transmission. Values of $T_{proc}$ are given in symbols in Table A and Table B, so a process of converting the symbols to a unit of msec or sec may be performed when $T_{proc}$ is applied to Equation A.

In the meantime, the BS (A-01) may indicate to the UE (A-03) which slots are used to transmit the PSCCH (A-07) and the PSSCH (A-09) in sidelinks (i.e., timing information), and the transmission timing information of the PSCCH (A-07) and the PSSCH (A-09) may be determined based on a combination of higher layer signaling and a DCI bit field indicator. Furthermore, sidelink timing information may be given to perform transmission in a first available sidelink transmission slot that comes after the point in time calculated from Equation B.

$$T_{DL} - T^{TA} + T_{indicated} \quad \text{[Equation B]}$$

$T_{indicated}$ may be a value determined based on higher layer signaling and/or a DCI bit field indicator from the BS, and $T_{DL}$ and $T^{TA}$ may have the same meaning as used in Equation A. $T_{indicated}$ may be a value determined according to a configured grant transmission configuration.

Equation A or Equation B may be replaced by Equation C below.

$$T_{DL} - \frac{N_{TA}}{2} \times T_S + (4+m) \times 10^{-3} \quad \text{[Equation C]}$$

In Equation C, m may be a value indicated in one or multiple bit fields of DCI, a preset value, or a value determined based on a UE capability. In Equation C, $N_{TA}$ may be a value indicated from the BS, and Ts may be given as $T_s=1/(15000\times 2048)$ sec.

Sidelink transmission may be performed in the first slot available for sidelink transmission in the resource pool after the preparation time provided in Equation A, Equation B, or Equation C from a time at which the UE receives the PDCCH.

Second Embodiment

In the second embodiment, provided is a method and apparatus for determining, by the UE, uplink and sidelink signal transmission.

Figure 18:
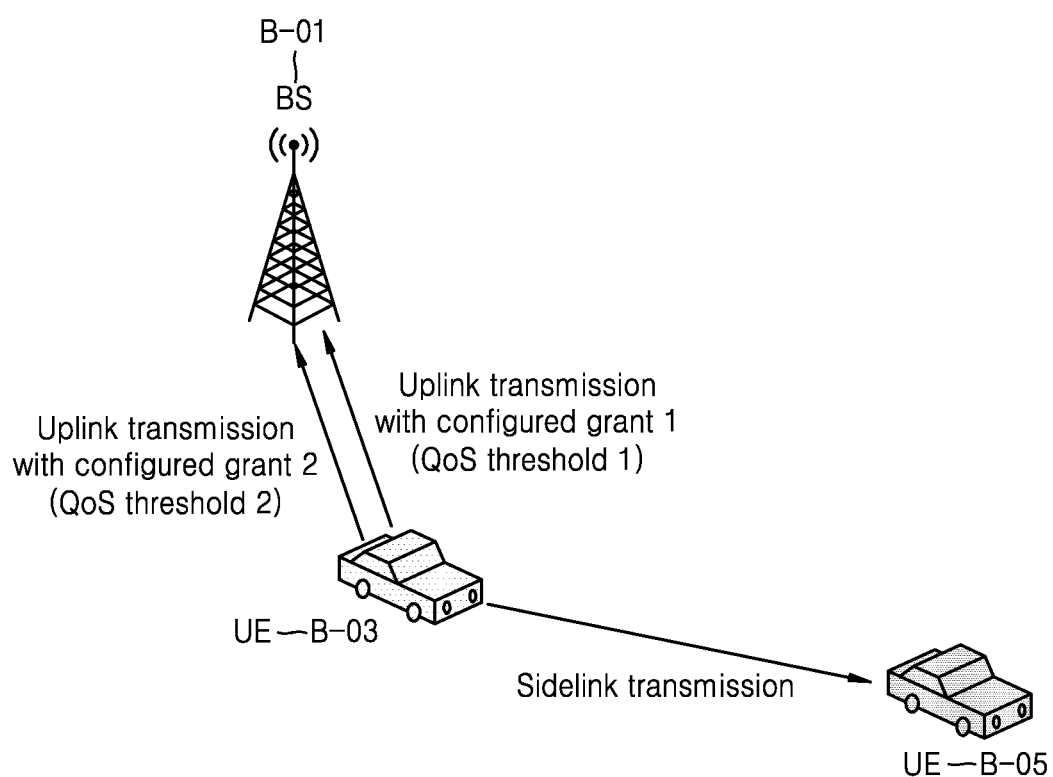
FIG. 18 is a diagram for describing a method in which a UE determines uplink and sidelink signal transmission, according to an embodiment of the disclosure.

FIG. 18 is a diagram for describing a method in which a UE determines uplink and sidelink signal transmission, according to an embodiment of the disclosure.

Specifically, referring to FIG. 18, a UE (B-03) may perform UL transmission to a BS (B-01), and determine uplink and sidelink transmission when performing sidelink transmission to another UE (B-05).

The BS (B-01) may configure the UE (B-03) with one or more UL configured grant (CG) resources. UL CG resource configuration may be configuring resources for the UE (B-03) to be able to perform UL data transmission without separate scheduling DCI. Although there is no separate scheduling DCI, DCI for activation/deactivation of UL transmission with a CG (or CG UL transmission) may be transmitted to the UE. The CG UL transmission may be called a semi-persistent scheduling (SPS) UL transmission. The BS (B-01) may configure the UE (B-03) with configurations for a plurality of CG UL transmissions. Specifically, it may give the UE scheduling information for the CG UL transmission with first CG configuration, second CG configuration, . . . , N-th CG configuration, and each CG configuration may include an available time and periodicity for UL transmission, frequency resource allocation information, etc. Accordingly, the UE (B-03) may transmit UL data, i.e., a PUSCH, in a resource corresponding to each CG configuration. When the UE (B-03) that performs sidelink transmission or reception receives the UL CG configuration, the BS (B-01) may set a QoS threshold for each CG configuration. The QoS threshold may be used to determine which one of sidelink transmission and uplink transmission will be performed, when the sidelink transmission and the uplink transmission are scheduled or determined to be transmitted in the same slot or at the same time. Specifically, the QoS threshold set for CG UL transmission may be compared with QoS determined for sidelink transmission, and one with higher priority may be transmitted while the other is not transmitted. Alternatively, the QoS threshold set for CG UL transmission may be compared with QoS determined for sidelink transmission to allocate transmit power first to one with higher priority and allocate the remaining power, if any, to the other. Having higher priority may mean that a QoS parameter, priority, may have a low value. This may be allocated by the BS (B-01) for a different use for each CG configuration, and CGs with different uses and purposes may be differently determined according to determination of the priority over sidelink transmission.

Figure 19:
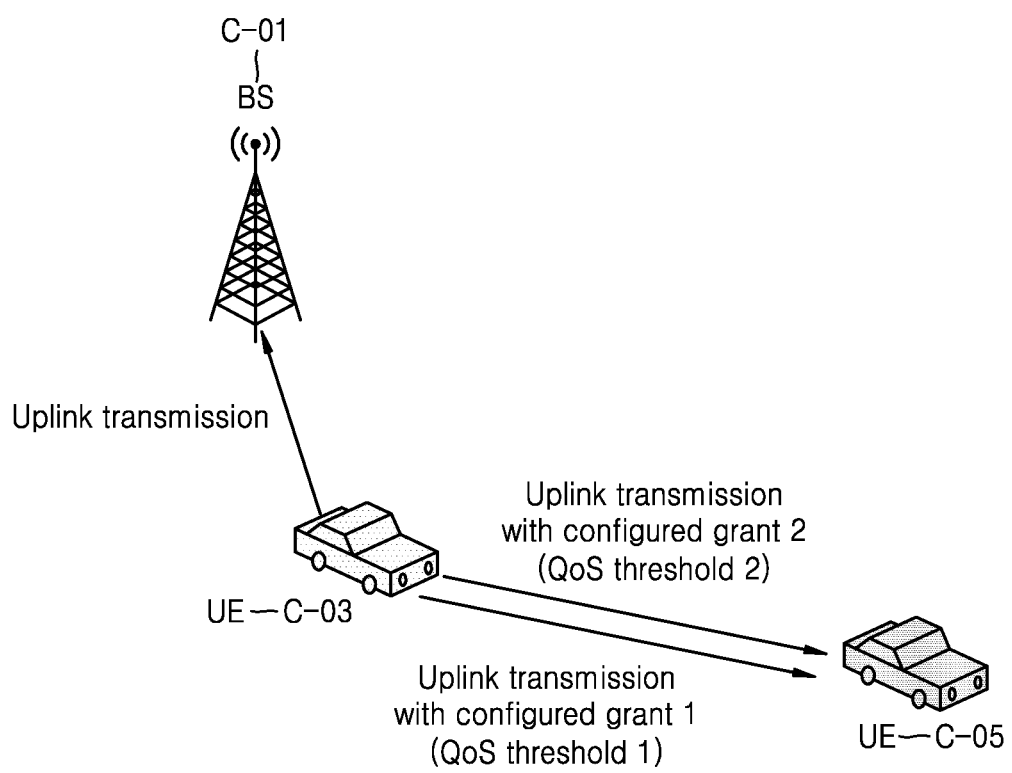
FIG. 19 is a diagram for describing another method in which a UE determines uplink and sidelink signal transmission, according to an embodiment of the disclosure.

FIG. 19 is a diagram for describing another method in which a UE determines uplink and sidelink signal transmission, according to an embodiment of the disclosure.

Referring to FIG. 19, a UE (C-03) may perform UL transmission to a BS (C-01), and determine uplink and sidelink transmission when performing sidelink transmission to another UE (C-05). In FIG. 19, for sidelink transmission, the BS (C-01) may provide one or more CG configurations for sidelink transmission.

The BS (C-01) may configure the UE (C-03) with resources for one or more CG sidelink transmissions. This is an occasion when the BS (C-01) may configure sidelink resources for the UE (C-03) so that the UE (C-03) is able to perform sidelink data transmission without separate sidelink scheduling DCI. Although there is no separate scheduling DCI in FIG. 19, DCI for activation/deactivation of the configured CG sidelink transmission may be transmitted to the UE. The CG sidelink transmission may be called a semi-persistent scheduling (SPS) sidelink transmission. The BS (C-01) may configure the UE (C-03) with configurations for a plurality of CG sidelink transmissions. Specifically, it may give the UE (C-03) scheduling information for the CG sidelink transmission with first CG configuration, second CG configuration, . . . , N-th CG configuration, and each CG configuration may include an available time and periodicity for sidelink transmission, sidelink resource pool information, and frequency resource allocation information, etc. Accordingly, the UE (C-03) may transmit sidelink data, i.e., a PSSCH, in a resource corresponding to each CG configuration. When the UE (B-03) that performs sidelink transmission or reception receives the sidelink CG configuration, the BS (C-01) may set a QoS threshold for each CG configuration. The QoS threshold may be used to determined which one of sidelink transmission and uplink transmission will be performed, when the sidelink transmission and the uplink transmission are scheduled or determined to be transmitted in the same slot or at the same time. Specifically, the QoS threshold set for CG sidelink transmission may be compared with QoS determined for sidelink transmission, and when the sidelink priority is high, sidelink transmission may be performed while the UL transmission is prevented. Alternatively, the QoS threshold set for CG sidelink transmission may be compared with QoS determined for sidelink transmission, and when the sidelink priority is high, transmit power may be allocated first to the sidelink transmission and the remaining power, if any, may be allocated next to the UL transmission. Having higher priority may mean that a QoS parameter, priority, may have a low value. This may be allocated by the BS (C-01) for a different use for each CG configuration, and CGs with different uses and purposes may be differently determined according to determination of the priority over uplink transmission.

Regardless of UL transmission of the UE (C-03), when the UE (C-03) receives a sidelink CG configuration for sidelink transmission from the BS (C-01), the sidelink CG transmission configuration may include the QoS threshold information as well. When receiving the sidelink CG configuration including the QoS threshold information, the UE (C-03) may transmit the corresponding data in a resource configured in the sidelink CG configuration in performing sidelink transmission only when a QoS value of the data to be transmitted has higher priority than the QoS threshold. Having higher priority may mean that a QoS parameter, priority, may have a low value.

Third Embodiment

In the third embodiment, provided is a method and apparatus, in which the UE applies timing advance while performing a sidelink operation.

Figure 20:
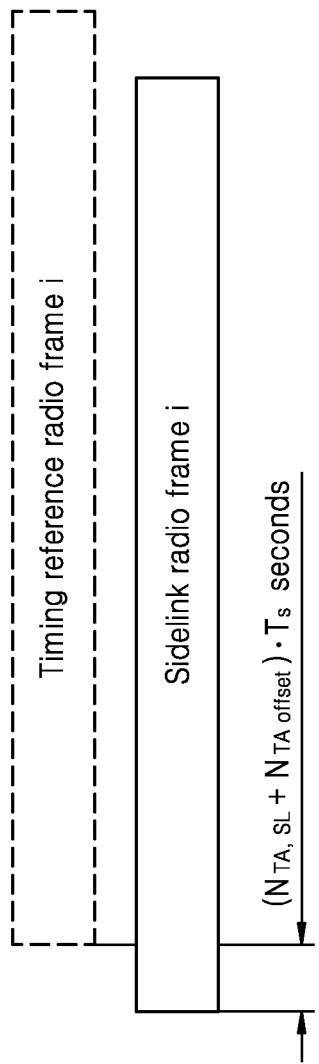
FIG. 20 is a diagram for describing a method in which a UE applies timing advance while performing a sidelink operation, according to an embodiment of the disclosure.

FIG. 20 is a diagram for describing a method in which a UE applies timing advance while performing a sidelink operation, according to an embodiment of the disclosure.

Specifically, FIG. 20 illustrates application of timing advance (TA) that advances transmission timing for sidelink transmission from a reference time. Specifically, as shown in FIG. 20, the UE may transmit a sidelink signal at a time advanced by $(N_{TA,SL}+N_{TA,offset}) \times T_s$ seconds from the reference time. $N_{TA,SL}$ is a parameter for calculating a TA value to be applied for sidelink. $N_{TA,offset}$ may be another parameter for calculating the TA value. Ts may be given as $T_s=1/(15000 \times 2048)$ seconds. $N_{TA,offset}$ may be preset to a value such as 0 or 624. $N_{TA,SL}$ may be determined by one or more combinations of the following methods:

Method 1: $N_{TA,SL}$ may be set according to a resource pool in which the UE operates. Specifically, when the resource pool is configured or pre-configured from the BS, $N_{TA,SL}$ may be set as well. This is to minimize interference between UEs, which may be predetermined for transmission and reception in a resource pool, while the UEs are performing sidelink transmission and reception.

Method 2: The set $N_{TA,SL}$ may not always be a fixed value, but may be differently set/indicated by the BS or may be set/indicated by a UE for unicast or groupcast sidelink operations from an MAC CE. In the case of being set/indicated by the BS or the other UE, value of $N_{TA,SL}$ itself may be set/indicated. Alternatively, a value of change in $N_{TA,SL}$ may be set/indicated. In this case, a value to be added to or subtracted from the previously applied $N_{TA,SL}$ may be set/indicated.

Method 3: It may be differently applied depending on the frequency at which to perform sidelink signal transmission. For example, in a case of performing sidelink transmission or reception at a frequency for UL, TA to be applied for performing sidelink transmission may be assumed to be the same value as TA set in the UL. This may be a case of applying the TA for UL indicated by the BS equally for sidelink or a case that the BS indicates the same value as a TA value for UL as the TA value for sidelink.

Fourth Embodiment

In the fourth embodiment, provided is a method and apparatus of exchanging information through PC5-RRC between UEs in configuring scheduling related information to perform sidelink unicast or groupcast communication.

As described above in connection with FIG. 4C, UEs (UE-A and UE-B) may exchange configuration information with each other via higher layer signaling such as PC5-RRC signaling after a connection procedure in sidelinks. The two UEs (UE-A and UE-B) may exchange one or more of the following parameters with each other through PC5-RRC or through a control element (CE) of the lower sidelink MAC layer.

configuration of a resource pool for unicast or groupcast control and data signal transmission or reception scheduling information for unicast or groupcast signal transmission, which may be configuration information for CG sidelink transmission.

a signal for delivering configuration information from a BS

Information of the resource pool for unicast or groupcast control and data signal transmission or reception may be different from a resource pool for sidelink broadcasting, and may have different configuration information from a resource pool delivered via PC5-RRC signaling.

Fifth Embodiment

In the fifth embodiment, provided is a method and apparatus for determining the number of slot-aggregated slots and transmitting or receiving sidelink control information (SCI), when performing slot aggregation while performing sidelink data transmission or reception.

Figure 21:
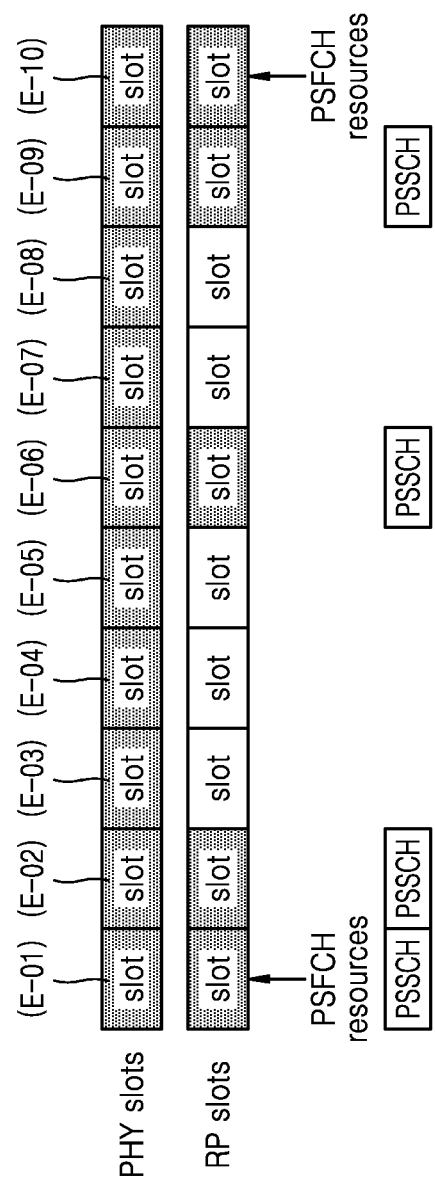
FIG. 21 is a diagram for describing slots included in a resource pool based on configuration of a resource pool into resource pool physical slots, according to an embodiment of the disclosure.

FIG. 21 is a diagram for describing slots included in a resource pool based on configuration of a resource pool into resource pool physical slots, according to an embodiment of the disclosure.

Referring to FIG. 21, illustrated are resource pool slots (RP slots) belonging to a certain resource pool among physical slots E-01, E-02, E-03, E-04, E-05, E-06, E-07, E-08, E-09, and E-10. Referring to FIG. 21, PSSCHs may be transmitted or received in the RP slots. Of the physical slots E-01, E-02, E-03, E-04, E-05, E-06, E-07, E-08, E-09, and E-10, only the slots E-01, E-02, E-06, E-09, and E-10 may belong to the certain resource pool. With configuration of the resource pool, resources may be configured to transmit the PSFCH in every N RP slots among the slots belonging to the resource pool. Referring to FIG. 21, PSSCHs may be transmitted or received in slots E-01, E-02, E-06, and E-09. The same TB may be transmitted in the PSCCHs transmitted in the multiple slots. A TB size of the same TB may be calculated based on the number of aggregated slots. For example, a single TB may be transmitted in the slots E-01, E-02, E-06 and E-09 in FIG. 21

When a UE that performs transmission or reception transmits or receives a PSSCH by applying slot aggregation, the number of slot-aggregated slots and a position of a start slot may be determined based on one or more combinations of the following methods:

Method 1: A start point in time for slot aggregation based transmission may be determined according to the slots in which the PSFCH is transmitted. In method 1, a new TB may be transmitted on the PSSCH only in the slot in which the PSFCH is transmitted. Alternatively, a new TB may be transmitted in a slot before X slots with respect to the RP slot from the slot in which the PSFCH is transmitted. The value of X may refer to an offset, which may refer to a relative slot which is X slots away and belongs to the resource pool rather than the actual physical X-th slot.

Method 2: A position of a start slot and the number of aggregated slots based on configuration of a resource pool may be determined.

When a TB is transmitted by slot aggregation, the UE may detect a PSCCH first to obtain scheduling information of a corresponding PSSCH. Detection of the PSCCH may be tried only at a point in time at which a new TB transmission is started in slot aggregation determined by pre-configuration.

Furthermore, a UE for transmitting data may transmit a PSCCH for PSSCH scheduling only at a time when transmission of a new TB is started in slot aggregation determined by pre-configuration.

Although the first to fifth embodiments of the disclosure are separately described for convenience of explanation, it is possible to combine two or more of the embodiments because each embodiment includes mutually-related functions.

Figure 22:
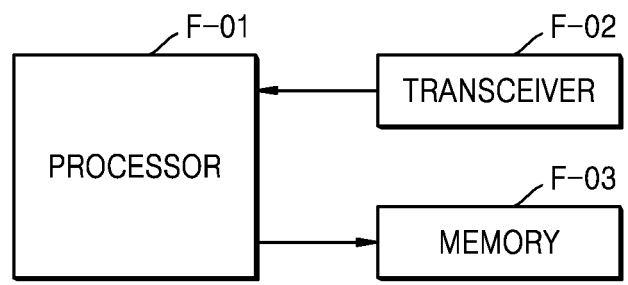
FIG. 22 illustrates an internal structure of a UE, according to an embodiment of the disclosure.
Figure 23:
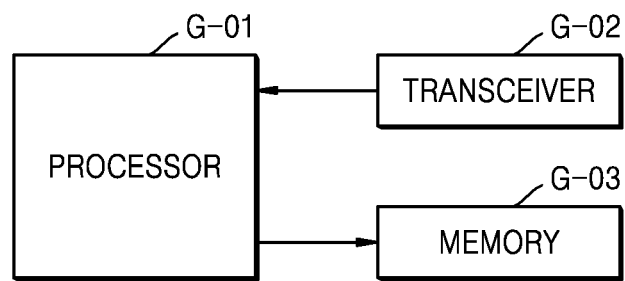
FIG. 23 illustrates an internal structure of a BS, according to an embodiment of the disclosure.

Transmitters, receivers, and processors of the UE and the BS to implement the embodiments of the disclosure are shown in FIGS. 22 and 23, respectively. Transmission or reception methods between the BS and the UE or between a transmitting terminal and a receiving terminal to perform operations for determining sidelink signal transmission or reception are described in the first to fifth embodiments, and to perform the methods, transmitters, receivers, and processors of the UE and the BS may operate according to the embodiments.

FIG. 22 is a block diagram illustrating an internal structure of a UE, according to an embodiment of the disclosure. Specifically, as shown in FIG. 22, the UE in the disclosure may include a transceiver F-02, a memory F-03, and a processor F-01. The transceiver F-02, the memory F-03, and the processor F-01 of the UE may operate according to the aforementioned communication method of the UE. Components of the UE are not, however, limited thereto. For example, the UE may include more or fewer elements than described above. In addition, the transceiver F-02, the memory F-03, and the processor F-01 may be implemented in a single chip.

The transceiver F-02 may transmit or receive signals to or from a BS. The signals may include control information and data. For this, the transceiver F-02 may include an RF transmitter for up-converting the frequency of a signal to be transmitted and amplifying the signal and an RF receiver for low-noise amplifying a received signal and down-converting the frequency of the received signal. It is merely an example of the transceiver F-02, and the elements of the transceiver F-02 are not limited to the RF transmitter and RF receiver. In addition, the transceiver F-02 may receive a signal on a wireless channel and output the signal to the processor F-01, or transmit a signal output from the processor F-01 on a wireless channel. The processor F-01 may control a series of processes for the UE to be operated according to the embodiments of the disclosure. For example, the transceiver F-02 of the UE may receive control information from the BS in a DL, and the processor F-01 may determine whether or how to perform sidelink transmission according to the control information and pre-configured configuration information and accordingly, perform transmission preparation. Subsequently, the transceiver F-02 may deliver scheduled feedback to the BS.

FIG. 23 is a block diagram of an internal structure of a base station, according to an embodiment of the disclosure. Specifically, referring to FIG. 23, a BS of the disclosure may include a transceiver G-02, a memory G-03, and a processor G-01. The transceiver G-02, the memory G-03, and the processor G-01 of the BS may operate according to the aforementioned communication method of the BS. Components of the BS are not, however, limited thereto. For example, the BS may include more or fewer elements than described above. In addition, the transceiver G-02, the memory G-03, and the processor G-01 may be implemented in a single chip.

The transceiver G-02 may transmit or receive signals to or from a UE. The signals may include control information and data. For this, the transceiver G-02 may include an RF transmitter for up-converting the frequency of a signal to be transmitted and amplifying the signal and an RF receiver for low-noise amplifying a received signal and down-converting the frequency of the received signal. It is merely an example of the transceiver G-02, and the elements of the transceiver G-02 are not limited to the RF transmitter and RF receiver.

In addition, the transceiver G-02 may receive a signal on a wireless channel and output the signal to the processor G-01, or transmit a signal output from the processor G-01 on a wireless channel.

The memory G-03 may store a program and data required for an operation of the BS. Furthermore, the memory G-03 may store control information or data included in a signal obtained by the BS. The memory G-03 may include a storage medium such as a read only memory (ROM), a random access memory (RAM), a hard disk, a compact disc ROM (CD-ROM), and a digital versatile disk (DVD), or a combination of storage mediums.

The processor G-01 may control a series of processes for the BS to be operated according to the embodiments of the disclosure.

For example, the processor G-01 may transmit DL control signal to the UE as needed, based on configuration information configured by itself. Subsequently, the transceiver G-02 may transmit related scheduling control information and receive feedback information from the UE.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments of the disclosure may be operated by being combined with one another if necessary. Although the embodiments of the disclosure are proposed based on an LTE system, a 5G system, etc., modifications to the embodiments of the disclosure, which do not deviate from the scope of the disclosure, may be applicable.

The invention claimed is:

1. An operating method performed by a user equipment (UE) in a wireless communication system, the method comprising:
receiving, from a base station (BS), an uplink configured grant configuration including information associated with a priority of an uplink transmission and a sidelink configuration including information associated with a priority of a sidelink transmission;
performing prioritization between the uplink transmission and the sidelink transmission, based on the information associated with the priority of the uplink transmission and the information associated with the priority of the sidelink transmission; and
performing only the uplink transmission or the sidelink transmission with a higher priority, based on the performing of the prioritization.

2. The operating method of claim 1, wherein the uplink configured grant configuration or the sidelink configuration is to transmit an uplink data or a sidelink data in a semi-persistent scheduling (SPS) scheme.

3. The operating method of claim 1, further comprising: transmitting the sidelink configuration to another UE.

4. The operating method of claim 1, wherein the sidelink configuration comprises information to change a transmission time of a sidelink data to be earlier than a reference time by a certain time (timing advance information),
wherein the transmitting comprises
transmitting the sidelink data earlier than the reference time by the certain time when the sidelink data is determined to be transmitted.

5. A non-transitory computer-readable recording medium having stored therein a program to execute The operating method of claim 1 on a computer.

6. The operating method of claim 1,
wherein the uplink transmission is activated by the uplink configured grant configuration.

7. The operating method of claim 1,
wherein the uplink transmission and the sidelink transmission are scheduled in a same resource.

8. A user equipment (UE) in a wireless communication system, the UE comprising:
a transceiver; and
at least one processor,
wherein the at least one processor is configured to
receive, from a base station (BS), an uplink configured grant configuration including information associated with a priority of an uplink transmission and a sidelink configuration including information associated with a priority of a sidelink transmission,
perform prioritization between the uplink transmission and the sidelink transmission, based on the information associated with the priority of the uplink transmission and the information associated with the priority of the sidelink transmission, and
perform only the uplink transmission or the sidelink transmission with a higher priority, based on the performing of the prioritization.

9. The UE of claim 8, wherein the uplink configured grant configuration or the sidelink configuration is to transmit an uplink data or a sidelink data in a semi-persistent scheduling (SPS) scheme.

10. The UE of claim 8, wherein the at least one processor is configured to transmit the sidelink configuration to a receiving UE.

11. The UE of claim 8, wherein the sidelink configuration comprises information to change a transmission time of a sidelink data to be earlier than a reference time by a certain time (timing advance information), and
wherein the sidelink data is transmitted earlier than the reference time by the certain time when the sidelink data is determined to be transmitted.

12. The UE of claim 8,
wherein the uplink transmission is activated by the uplink configured grant configuration.

13. The UE of claim 8,
wherein the uplink transmission and the sidelink transmission are scheduled in a same resource.

* * * * *